(12) United States Patent
Mawby et al.

(10) Patent No.: US 11,940,096 B2
(45) Date of Patent: Mar. 26, 2024

(54) CLEANING DEVICE FOR CONDENSATE REMOVAL DEVICE

(71) Applicant: THERMAL ENERGY INTERNATIONAL (UK) LIMITED, Bristol (GB)

(72) Inventors: Sam Mawby, Bristol (GB); Luca Bianchi, Bristol (GB)

(73) Assignee: THERMAL ENERGY INTERNATIONAL 9UK) LIMITED, Bristol (GB)

(*) Notice: Subject to any disclaimer, the term of this patent is extended or adjusted under 35 U.S.C. 154(b) by 272 days.

(21) Appl. No.: 17/262,616

(22) PCT Filed: Jul. 24, 2019

(86) PCT No.: PCT/EP2019/069958
§ 371 (c)(1),
(2) Date: Jan. 22, 2021

(87) PCT Pub. No.: WO2020/020965
PCT Pub. Date: Jan. 30, 2020

(65) Prior Publication Data
US 2021/0262613 A1   Aug. 26, 2021

(30) Foreign Application Priority Data

Jul. 27, 2018 (GB) .................................... 1812292

(51) Int. Cl.
*F16T 1/38* (2006.01)
*B08B 9/04* (2006.01)
*F16T 1/34* (2006.01)

(52) U.S. Cl.
CPC .................. *F16T 1/38* (2013.01); *B08B 9/04* (2013.01); *F16T 1/34* (2013.01); *Y10T 137/4351* (2015.04)

(58) Field of Classification Search
CPC . B08B 9/04; F16K 29/00; F16K 3/188; F16K 24/046; Y10S 251/903;
(Continued)

(56) References Cited

U.S. PATENT DOCUMENTS 68,733 A * 9/1867 Grant ...................... F16K 29/00
251/221
195,181 A * 9/1877 Strohm ................... F41A 29/02
408/127

(Continued)

FOREIGN PATENT DOCUMENTS

EP         2119948 A1    11/2009
GB         2304300 A     3/1997
(Continued)

*Primary Examiner* — Craig J Price
(74) *Attorney, Agent, or Firm* — Leason Ellis LLP

(57) ABSTRACT

A cleaning device for cleaning an orifice in a condensate removal device that is capable of use while the condensate removal device is on-line, i.e. during operation. In one aspect, the cleaning device provides a reciprocally movable cleaning rod that can be retractably insertable into the orifice. This can be done without affecting the sealed volume defined around the orifice. In another aspect, the cleaning device includes a retractable hood or shield over the cleaning rod, to protect when not inserted in the orifice.

16 Claims, 16 Drawing Sheets

(58) Field of Classification Search
CPC .......... Y10S 137/903; Y10T 137/0424; Y10T 137/3015; Y10T 137/3068; Y10T 137/3037; Y10T 137/7323; Y10T 137/3071; Y10T 137/1534; Y10T 137/7358; Y10T 137/4336–4351; Y10T 137/794–8122; F16T 1/20; F16T 1/22; F16T 1/386; F22B 37/545
USPC ...... 137/242, 244, 245, 245.5, 15.07, 15.06, 137/15.01, 544–550; 15/104.03, 15/104.05–104.33; 431/123, 122, 121, 431/32, 3; 239/117, 116, 115, 114, 106, 239/104
See application file for complete search history.

(56) References Cited

U.S. PATENT DOCUMENTS

| | | | | |
|---|---|---|---|---|
| 452,535 | A * | 5/1891 | Winkler | F16K 29/00 137/903 |
| 751,538 | A * | 2/1904 | Murdock | F01P 11/0276 15/104.16 |
| 986,844 | A * | 3/1911 | McCloskey | B08B 9/0436 137/15.01 |
| 1,001,111 | A * | 8/1911 | Wood | F16K 29/00 137/553 |
| 1,063,334 | A * | 6/1913 | Donnelly | F16K 29/00 137/244 |
| 1,159,977 | A * | 11/1915 | Massey et al. | B08B 9/0436 137/242 |
| 1,199,350 | A * | 9/1916 | Collin | B01D 29/05 210/414 |
| 1,801,959 | A * | 4/1931 | Hopkins | F16K 1/38 251/142 |
| 1,840,863 | A * | 1/1932 | Wenderhold | F23D 11/10 239/117 |
| 2,218,446 | A * | 10/1940 | Wright | F16K 1/38 137/244 |
| 2,448,816 | A * | 9/1948 | May | F22B 37/545 251/368 |
| 2,952,412 | A * | 9/1960 | Munson | C02F 1/42 239/117 |
| 3,785,555 | A * | 1/1974 | Fujiwara | F16T 1/22 137/195 |
| 3,893,473 | A * | 7/1975 | Breece | F16T 1/34 137/203 |
| 3,922,746 | A * | 12/1975 | Strunk | B08B 9/0436 15/104.095 |
| 4,047,695 | A * | 9/1977 | Cleveland | F16K 47/04 138/45 |
| 4,413,646 | A * | 11/1983 | Platt | F16K 1/427 137/625.37 |
| 4,486,208 | A | 12/1984 | Stavropoulos | |
| 4,629,120 | A * | 12/1986 | Diamond | B05B 7/0475 222/149 |
| 4,745,943 | A | 5/1988 | Mortensen | |
| 4,898,201 | A * | 2/1990 | Conley | B08B 1/00 285/382.7 |
| 4,938,246 | A | 7/1990 | Conley et al. | |
| 6,015,267 | A * | 1/2000 | Yumoto | F04F 1/06 417/54 |
| 6,363,566 | B1 * | 4/2002 | Collins | E03C 1/302 15/104.16 |
| 6,746,233 | B2 * | 6/2004 | Zabriskie | F23D 14/50 239/117 |
| 8,302,619 | B2 * | 11/2012 | Oike | F16T 1/22 236/93 R |
| 9,073,101 | B2 * | 7/2015 | Al-Shammari | B08B 9/021 |
| 9,121,549 | B2 * | 9/2015 | Mawby | F16T 1/34 |
| 9,168,571 | B2 * | 10/2015 | Desrosiers | B08B 9/0328 |
| 9,958,102 | B2 * | 5/2018 | Mawby | B03C 1/286 |
| 11,333,256 | B2 * | 5/2022 | Oike | F16K 1/385 |
| 2009/0044867 | A1* | 2/2009 | Chiang | F16T 1/38 137/182 |
| 2010/0126591 | A1* | 5/2010 | Oike | F16K 24/046 137/15.05 |
| 2019/0107207 | A1* | 4/2019 | Oike | F16K 1/38 |

FOREIGN PATENT DOCUMENTS

| | | | |
|---|---|---|---|
| GB | 2478536 A | 9/2011 | |
| GB | 2512210 A | 9/2014 | |
| WO | WO 1982/001667 A1 | 5/1982 | |
| WO | WO-2017217123 A1 * | 12/2017 | ............ F16K 1/38 |

* cited by examiner

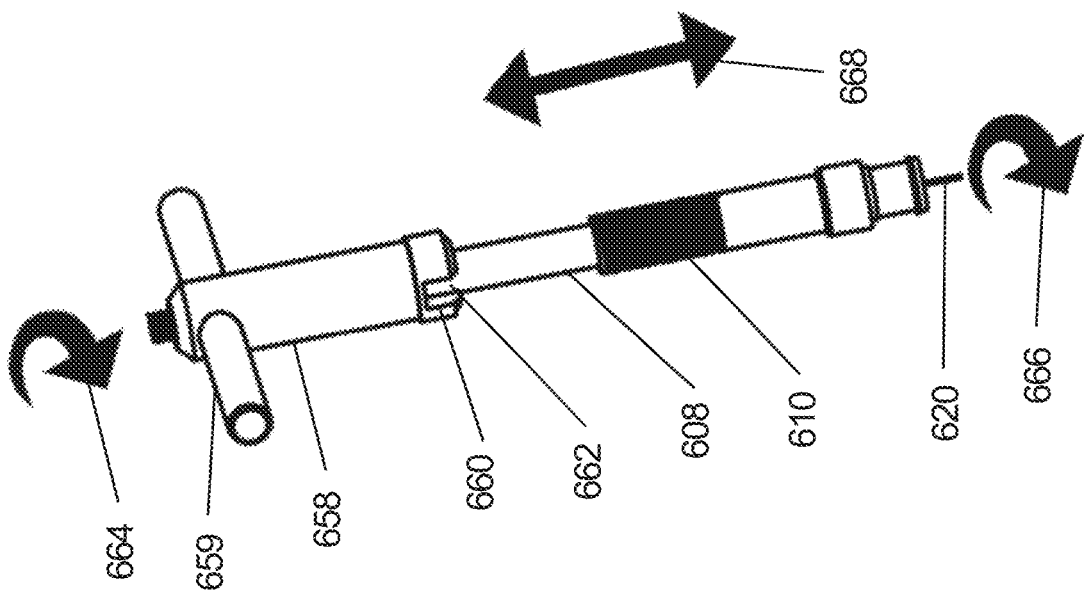
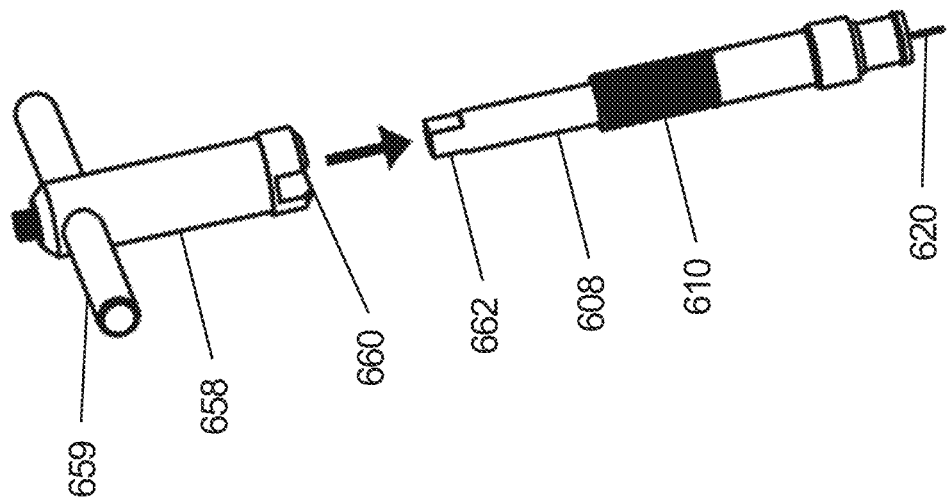

CLEANING DEVICE FOR CONDENSATE REMOVAL DEVICE

CROSS-REFERENCE TO RELATED APPLICATIONS

This application is a U.S. National Stage Application under 35 U.S.C. § 371 of International Patent Application No. PCT/EP2019/069958, filed Jul. 24, 2019, which claims priority to Great Britain Patent Application No. 1812292.9, filed Jul. 27, 2018, the contents of which are each hereby incorporated by reference in their respective entireties.

FIELD OF THE INVENTION

The invention relates to a cleaning device for cleaning (e.g. removing debris from) an orifice in condensate drainage channel of a condensate removal device. Condensate removal devices are often used for removing condensate from steam-conveying pipelines, where they are known as steam traps.

BACKGROUND

Steam is commonly used in industry as a medium for transporting heat energy from a central location via suitable pipelines to its point of use. The heat energy conveyed in the steam may be released at a suitable point by causing a phase change of the steam from gas to liquid. The phase change releases latent heat from the steam and causes liquid condensate to form.

The condensate and any trapped air needs to be removed from the pipelines, because its presence can cause corrosion and reduce the system's heat transfer efficiency. However, any device for removing condensate also needs to prevent steam from escaping, as this also reduces the system's heat transfer efficiency and may waste the energy transported by that steam.

GB 2 304 300 describes an example of a continuous flow fixed orifice (CFFO) steam trap. In such devices, an orifice (or constricted passage) is located in the flow path of steam travelling through a pipeline. The size of the orifice is chosen carefully such that the condensate, which flows through it much more slowly than the steam, acts to block the steam from passing.

U.S. Pat. No. 4,745,943 discloses an orifice steam trap in which the orifice is formed as part of a venturi, i.e. a conduit having a constricted passage therein, the constricted passage having smaller cross-sectional area than the remainder of the conduit. Condensate passing through the orifice thus enters a channel that opens out (e.g. flares outwardly) in the direction of flow. A pressure drop after the orifice causes flash steam to form from the saturated condensate, thereby regulating condensate flow.

As the orifice is typically small (e.g. about 0.4 mm in some cases), it may become blocked by debris which is transported in the flow in the pipeline. In order to clean the orifice, it is often necessary to remove the steam trap from the pipeline, to gain access to the orifice. In some steam traps, the orifice is disposed in a condensate drainage channel which is formed at a normal or oblique angle with respect to the axis of the pipeline. The steam trap may then include an access port formed in a sidewall of the trap, through which the orifice can be accessed. In this manner, the orifice may be cleaned without removing the steam trap from the pipeline.

SUMMARY OF THE INVENTION

At its most general, the present invention provides a cleaning device for cleaning an orifice in a condensate removal device that is capable of use while the condensate removal device is on-line, i.e. during operation. In one aspect, the cleaning device provides a reciprocally movable cleaning rod that can be retractably insertable into the orifice. This can be done without affecting the sealed volume defined around the orifice. In another aspect, the cleaning device includes a retractable hood or shield over the cleaning rod, to protect when not inserted in the orifice.

In some examples, the cleaning device has a cap which is mountable on an access port of the condensate removal device for accessing the orifice, and a cleaning rod which is movable relative to the cap to insert the cleaning rod into the orifice. The cleaning rod is shaped so that it can be inserted into the orifice to clear debris from the orifice. Both the orifice and the cleaning rod may have very small diameters, and the difference between their diameters may be extremely small (e.g. 0.005 mm). Mounting the cleaning device directly on the access opening may serve to align the cleaning rod relative to the orifice, to facilitate insertion of cleaning rod into the orifice. As the cleaning rod may have a very small diameter, it may be easily damaged. By aligning the cleaning tool with the orifice, damage to the cleaning tool may be avoided.

According to a first aspect of the invention, there is provided a cleaning device for cleaning an orifice of a condensate drainage channel in a condensate removal device, the cleaning device comprising: a cap which is mountable on an access opening of the condensate removal device; and a rod carrier having a cleaning rod thereon, the cleaning rod being receivable in the orifice; wherein the rod carrier is reciprocally movable relative to the cap, whereby the cleaning rod is retractably insertable into the orifice when the cap is mounted on the access opening. The cleaning device may be for use with a condensate removal device where the condensate drainage channel is at a normal or oblique angle relative to the axis of a pipeline in which the trap is mounted. The access opening may correspond to a port formed in a sidewall of the condensate removal device, through which the orifice in the condensate drainage channel can be accessed. For example, the access opening may face an entry port (e.g. inlet) of the condensate drainage channel. The orifice may be disposed at the entry port of the condensate drainage channel, or it may be disposed within the condensate drainage channel.

The reciprocal motion may be in a direction parallel with a length of the cleaning rod, which is referred to herein as a longitudinal direction. The reciprocal motion may be a longitudinal sliding motion, or may effected by rotation of the shaft. The cleaning device may include a biasing means (e.g. spring or the like) to urge the shaft in a direction that draws the cleaning rod away from the orifice.

The cap may act as a locating piece for aligning the cleaning rod relative to the orifice of the condensate removal device. The cap may be mountable on the access opening using any suitable means. For example, the cap may include a connector for attaching the cap to the access opening. In another example, the cap may be securable to the access opening using a clamp. The cap may be reversibly mountable on the access opening, i.e. a connection between the cap and the access opening may be reversibly made and unmade. Alternatively, the cap may be permanently mounted on the access opening, e.g. via a welded connection.

The rod carrier may include any suitable mechanism/component for holding the cleaning rod and enabling longitudinal motion relative to the cap. The cap may include a mechanism for enabling and/or controlling the longitudinal motion of the rod carrier relative to the cap. The longitudinal direction corresponds to a direction along which the cleaning rod is inserted into the orifice ("insertion direction"). The rod carrier is reciprocally movable, meaning that it is movable forwards and backwards along the longitudinal direction, e.g. towards the orifice and away from the orifice. The rod carrier may be movable between a first position where the cleaning rod is inserted into the orifice, and a second position where the cleaning rod is withdrawn from the orifice. The cleaning rod may be located at a distal end of the rod carrier. The cleaning rod may be integrally formed with the rod carrier. Alternatively, the cleaning rod may be attached to the rod carrier.

The cleaning rod is receivable in the orifice, e.g. it may be shaped so that it can be inserted through the orifice. For example, an outer diameter of the cleaning rod may be slightly smaller than a diameter of the orifice. A cross-sectional shape of the cleaning rod may match a cross-sectional shape of the orifice. The cleaning rod may be an elongate piece of material (e.g. wire). The length of the cleaning rod may be adapted so that when the cleaning rod is inserted into the condensate drainage channel (e.g. via an entry port of the condensate drainage channel), it extends through the orifice. In this manner, the cleaning rod may clear the orifice of any debris. The cleaning rod may, for example, be made from tempered high-carbon steel (spring steel or high-speed steel). In some cases, a drill blank may be used as the cleaning rod. A distal end of the cleaning rod may be shaped to facilitate removal of debris under a rotating action. For example the distal end may include a flattened region, e.g. spatula or spade-shaped portion.

In use, the cap may be mounted on the access opening of the condensate removal device. This may serve to align the cleaning rod with the orifice, e.g. the cleaning rod may be aligned along the longitudinal (insertion) direction. A user may then actuate the rod carrier to move the rod carrier along the longitudinal direction towards the orifice (i.e. in a distal direction), to insert the cleaning rod into the orifice. As the cleaning rod passes through the orifice, any debris present in the orifice may be pushed out of the orifice. The cleaning rod may then be retracted from the orifice, by moving the rod carrier away from the orifice (i.e. in a proximal direction).

In some embodiments, the cap may include a sealing surface configured to abut against a corresponding sealing surface on the condensate removal device, to form a seal around the access opening. The sealing surface on the cap may thus be arranged to form a seal with the corresponding sealing surface on the condensate removal device when the cap is mounted on the access opening. For example, the sealing surface on the cap may be arranged to compress a gasket against the sealing surface on the condensate removal device, in order to form a seal. The sealing surface on the cap may be smooth, or it may include a groove or ridges for holding a gasket in place. The gasket may be formed of any suitable compressible material for forming a seal (e.g. rubber, PTFE, or a soft metal such as copper or brass). In another example, the sealing surface on the cap may include a material thereon that forms a seal when secured against the sealing surface on the condensate removal device. Other types of seal may be used, e.g. a sealing threaded connection or a bolted gasket connection.

When the cleaning device is mounted on the access opening, the seal around the access opening may prevent gas or condensate from escaping from the condensate removal device via the access opening. The seal may be configured to withstand a pressure up to a pressure rating of a pipeline in which the condensate removal device may be mounted. The cleaning device may thus act as a plug/stopper for closing the access opening and preventing gas or condensate from leaking out. In this manner, once the cleaning device is mounted on the access opening, it may be left in place during operation of the condensate removal device, i.e. when the condensate removal device is connected in a pipeline and receives a flow of gas and condensate from the pipeline. The cleaning device may therefore be used to clean the orifice (by actuating the rod carrier to insert the cleaning rod into the orifice) while the condensate removal device is in use. The cleaning device may therefore be considered as an "online" cleaning device. This configuration of the cleaning device may avoid having to isolate the condensate removal device from the pipeline in order to perform cleaning of the orifice. Indeed, in conventional systems it is often necessary to isolate the isolate the condensate removal device from the pipeline (to stop the flow of gas and condensate to the condensate removal device), so that the access opening may be opened to clean the orifice. This configuration of the cleaning device may therefore facilitate cleaning of the orifice, and reduce or avoid down-time associated with cleaning the orifice. This configuration of the cleaning device may also reduce energy losses which can result from isolating the condensate removal device from the pipeline during a cleaning procedure (e.g. due to increased condensation of the gas in the pipeline).

In some embodiments, the cap may include a channel therethrough, the channel extending in the longitudinal direction; and the rod carrier may include a shaft, the shaft being insertable into the channel and reciprocally movable along to the channel. In this manner, the cleaning rod may be inserted into the orifice by inserting the shaft into the channel, and moving the shaft along the channel towards the orifice. The channel may extend all the way through the cap, i.e. from one side of the cap to an opposite side of the cap. The channel is shaped to receive the shaft. The channel may serve to guide the shaft as the shaft is moved in the longitudinal direction, to avoid misalignment between the cleaning rod and the orifice. A diameter of the channel may be substantially the same as an outer diameter of the shaft, to enable longitudinal motion of the shaft within the channel (i.e. motion along the length of the shaft), whilst restricting lateral motion of the shaft (i.e. motion in a direction normal to the longitudinal direction). For example, the fit between the shaft and the channel may be an interference fit. This may ensure accurate alignment of the cleaning rod with the orifice. The channel may be positioned and aligned within the cap to ensure that, when the cap is mounted on the access opening, the channel is aligned with the orifice in the longitudinal direction.

Together, the shaft and cleaning rod may form a cleaning tool that is an independent aspect of the invention. The cleaning rod may be located at a distal end of the shaft, e.g. an end of the shaft that in use faces towards the orifice. The shaft may be longer than the channel in the cap, to facilitate moving the shaft along the channel, e.g. in use a proximal end of the shaft (opposite to the distal end) may be accessible by the user to enable movement of the shaft along the channel.

In use, the cap may be mounted on the access opening of the condensate removal device. The shaft may then be inserted through the channel, so that the distal end of the shaft is located inside the condensate removal device. In some cases, the shaft may be inserted into the channel in the cap before the cap is mounted on the access opening. Then, the shaft may be moved along the channel towards the orifice, until the cleaning rod extends through the orifice. A user may move the shaft along the channel by actuating (e.g. pushing) the proximal end of the shaft. Any debris present in the orifice may thus be cleared by pushing the cleaning rod through the orifice. Subsequently, the cleaning rod may be withdrawn from the orifice, by moving the shaft along the channel, in a direction away from the orifice. This configuration of the cleaning device may thus facilitate insertion of the cleaning rod into the orifice.

In some embodiments, the cap may include a sealing element for forming a seal between the shaft and the channel. The seal between the shaft and the channel may serve to prevent condensable gas and/or condensate from escaping through the channel in the cap. The sealing element may be located within the channel, or at an end (e.g. proximal or distal) of the channel). The sealing element may be configured to form a sliding seal between the shaft and the channel, e.g. the sealing element may enable the shaft to move along the channel whilst maintaining the seal. In one example, the cap may include an O-ring (gasket) arranged such that, when the shaft is inserted into the channel, the shaft passes through the O-ring to form the seal. The seal between the shaft and the channel may be configured to withstand a pressure up to a pressure rating of a pipeline in which the condensate removal device may be mounted.

Where the cleaning device also includes a sealing surface for forming a seal around the access opening, the cleaning device may act as a plug/stopper for closing the access opening and preventing gas or condensate from leaking out. In particular, both the seal between the sealing surface of the cap and the condensate removal device and the seal between the shaft and the channel may prevent condensable gas and/or condensate from escaping via the access opening. Thus, once the cleaning device is mounted on the access opening, it may be left in place during operation of the condensate removal device. The seal between the shaft and the channel enables a user to move the shaft along the channel to insert the cleaning rod into the orifice, even when gas and/or condensate are flowing through the condensate removal device. Thus, as discussed above, the cleaning device may be used as an "online" cleaning device. As discussed above, this may facilitate cleaning of the orifice, and reduce downtime of the condensate removal device.

In some embodiments, the cap may include a first part and a second part that are connected together; and the sealing element may include a gasket that is compressed between the first part and the second part. The first part and the second part of the cap may be reversibly connected together, e.g. they may include connection means for reversibly connecting and disconnecting them. Alternatively, the first part and the second part may be permanently connected together, e.g. via an adhesive, a soldered connection or a welded connection. The connection between the first part and the second part may be adjustable, in order to adjust a spacing between the first part and the second part. This may serve to adjust the compression of the gasket between the first part and the second part. In some examples, the first part and the second part may be connected together via a threaded connection. The compression of the gasket may be increased by tightening the threaded connection, or decreased by loosening the threaded connection. The gasket may be made of any suitable compressible material for forming a seal (e.g. PTFE, rubber, or a soft metal such as copper or brass). The gasket may be an O-ring, which is arranged in the channel or at an end of the channel, such that when the shaft is inserted into the channel, the gasket forms a seal around the shaft.

In some embodiments, the shaft may include a threaded outer surface which is engageable with a corresponding threaded inner surface of the channel, the shaft being movable along the channel by engaging the threaded outer surface with the threaded inner surface. The threaded outer surface may be formed along all or a portion of the length of the shaft. Similarly, the threaded inner surface may be formed along all or a portion of the length of the channel. The threads on the outer threaded surface may be configured to translate rotational motion of the shaft about its longitudinal axis into longitudinal motion along its longitudinal axis. In this manner, when the shaft is inserted into the channel, it may be rotated in a first direction about its longitudinal axis to move it along the channel in a direction towards the orifice. The shaft may be rotated in a second, opposite, direction to move it along the channel in a direction away from the orifice. This may serve to provide control over the longitudinal motion of the shaft, to control the position of the cleaning rod relative to the orifice.

In some embodiments, the cleaning device may include a retraction limiter configured to limit retraction of the shaft along the channel in a proximal direction. The proximal direction refers to a direction of motion of the shaft away from the orifice. The retraction limiter may serve to prevent the shaft from being fully withdrawn from the channel when moving the shaft in the proximal direction. When the shaft is moved along the channel in the proximal direction (e.g. to remove the cleaning rod from the orifice), the retraction limiter may limit (i.e. block) further motion of the shaft in the proximal direction when the shaft reaches a predetermined position within the channel. Thus, when the cleaning device is mounted on a condensate removal device, the shaft may be movable between a first position where the cleaning rod is inserted into the orifice, and a second position where the cleaning rod is withdrawn from the orifice and the shaft is in the predetermined position (defined by the retraction limiter). Where a seal is formed between the channel and the shaft, the retraction limiter may prevent the seal from being broken by withdrawing the shaft from the channel. For example, the retraction limiter may prevent the shaft from being withdrawn from an O-ring (gasket) forming the seal between the cap and the shaft.

In some embodiments, the retraction limiter may include a radial lip in the channel and a stopping surface on the shaft, the stopping surface being configured to engage the radial lip when the shaft is moved along the channel in the proximal direction. The lip may, for example, be a protrusion extending radially from a channel wall in the channel. In some case, the lip may correspond to a junction between a section of the channel having a larger diameter and a section of the channel having a smaller diameter. The stopping surface may be a protrusion that protrudes radially from the shaft. The stopping surface may, for example, be a ring of material disposed around an outer surface of the shaft. In some cases, the stopping surface may correspond to a junction between a portion of the shaft having a larger outer diameter and a portion of the shaft having a smaller outer diameter. As the shaft is moved along the channel in the proximal direction (e.g. to remove the cleaning rod from the orifice), the stopping surface on the shaft may engage the lip in the channel when the shaft reaches the predetermined position in the channel. Engagement between the lip and the stopping surface may block further motion of the shaft along the channel in the proximal direction. This may prevent the shaft from being fully withdrawn from the channel by moving the shaft in the proximal direction. In this manner, when the cleaning device is mounted on the access opening, engagement between the stopping surface and the lip may prevent the shaft from being pulled out of the channel.

In some embodiments, when the stopping surface on the shaft is engaged with the radial lip in the channel, the cleaning rod is disposed within the channel. Thus, when the stopping surface is engaged with the lip, the cleaning rod may be surrounded by a wall of the channel. When the cleaning rod is in this position, it may be protected by the wall of the channel. In this manner, when the cleaning rod is not in use, the shaft may be moved along the channel until the stopping surface engages the lip, so that the cleaning rod is protected within the channel. This may avoid damage to the cleaning rod when it is not in use. This may be particularly advantageous, for example, where the cleaning device is an "online" cleaning device that is mounted on the condensate removal device for extended periods of time, as the cleaning rod can be withdrawn into the channel during normal operation of the condensate removal device.

In some embodiments, the cleaning device may further include a shield mounted on the rod carrier (e.g. shaft), the shield being movable relative to the rod carrier between a first position where a portion of the cleaning rod is covered by the shield and a second position where the portion of the cleaning rod is exposed. Thus, when the shield is in the first position, a portion (or all) of the cleaning rod may be protected by the shield. In the first position, the shield may block the cleaning rod from being inserted into the orifice. When the shield is in the second position, the portion (or all) of the cleaning rod is exposed so that it may be inserted into the orifice. In this manner, as the rod carrier is being moved along the channel towards the orifice, the shield may be in the first position to protect the cleaning rod. When the cleaning rod reaches the orifice, the shield may be moved to the second position, so that the cleaning rod can be inserted into the orifice. This may serve to avoid damage to the cleaning rod while it is being moved towards/away from the orifice. Herein, a portion of the cleaning rod is said to be "covered" by the shield if the shield is arranged to protect that portion of the cleaning rod. For example, the shield may protect a portion of the cleaning rod if it surrounds or encloses that portion of the cleaning rod. The shield may also be arranged to protect a portion of the cleaning rod if it is disposed on a side of the cleaning rod.

The shield may be an independent aspect of the invention. In this aspect, there is provided a cleaning device (also referred to herein as a cleaning tool) for cleaning an orifice of a condensate drainage channel in a condensate removal device, the cleaning device comprising: a rod carrier having a cleaning rod at one end; and a shield mounted on the rod carrier, the shield being movable relative to the rod carrier between a first position where a portion of the cleaning rod is covered by the shield and a second position where the portion of the cleaning rod is exposed, wherein the cleaning device is insertable into an access opening of the condensate removal device, wherein the shield is retractable to the second position to permit insertion of the cleaning rod into the orifice.

The rod carrier may be a shaft receivable in a channel formed in a cap as discussed above. The channel in the cap may be sized so that the shaft having the shield mounted thereon is insertable into the channel. The shield may be movable relative to the shaft in the longitudinal direction, e.g. along a portion of the length of the shaft. For example, the shield may be slidable relative to the shaft between the first position and the second position. In some cases, the shield may include a sleeve which is slidable over a portion of the shaft. The shield may be mounted on the shaft such that the range of motion of the shield relative to the shaft is limited. For example, a set of inter-engaging features may be provided on the shaft and the shield to limit the relative motion between the shield and the shaft. The set of inter-engaging features may also serve to transmit longitudinal motion of the shaft along the channel to the shield. The shield may be moved between the first and the second position using any suitable mechanism (e.g. a control rod extending through the shaft). The shield may be shaped to surround all or a portion of the cleaning rod when the shield is in the first position. For example, the shield may include an annular element arranged to surround a portion of the cleaning rod in the first position. In another example, the shield may include one or more shield elements which are arranged around the cleaning rod in the first position.

In some embodiments the shield may be biased towards the first position. In this manner, the shield may automatically return to the first position when the cleaning device is not in use, to protect the cleaning rod. The shield may be biased towards the first position by means of a spring (or other suitable elastic member) which is mounted between the shield and the shaft. The spring may be mounted such that moving the shield from the first position to the second position causes the spring to be compressed, so that it exerts a restoring force on the shield.

In some embodiments, the shield may include an engagement surface configured to engage a first surface of the condensate removal device when the shaft is moved towards the orifice, such that engagement between the engagement surface and the first surface blocks longitudinal motion of the shield towards the orifice. The first surface may be formed in a wall of a chamber of the condensate removal device where the entry port to the condensate drainage channel is located. For example, the first surface may be located around or adjacent to the entry port of the condensate drainage channel. In some cases, the engagement surface may be configured to engage the entry port of the condensate drainage channel. In use, the shaft may be moved towards the orifice to clean the orifice. This may cause engagement between the engagement surface on the shield and the first surface of the condensate removal device. As the shaft is moved further towards the orifice, longitudinal motion of the shield is be blocked by the engagement between the engagement surface and the first surface, such that the shield may move relative to the shaft. In this manner, the shield may be moved from the first position to the second position when the shaft is moved along the channel towards the orifice. Thus, the shield may automatically be moved to the second position as the shaft is moved towards the orifice, so that the cleaning rod can be inserted into the orifice. This may avoid the need of a separate mechanism (e.g. control wire) for controlling the position of the shield. Where the shield is biased towards the first position, the shield may return to the first position when the shaft is moved back along the channel away from the orifice.

The engagement surface may be disposed on a side or an end of the shield. In some examples, the engagement surface may be formed by an end of the shield that faces towards the entry port of the condensate drainage channel when the cleaning device is in use. The engagement surface may be arranged to engage the first surface before the cleaning rod reaches the entry port of the condensate drainage channel. In this way, the shield may be moved from the first position towards the second position before the cleaning rod reaches the entry port. For example, the engagement surface may be formed on a portion of the shield that extends beyond a distal end of the cleaning rod.

In some embodiments, the engagement surface is formed by a shroud, the shroud defining a recess for receiving an entry port of the condensate drainage channel. The shroud may be formed on an end (e.g. distal end) of the shield facing towards the entry port of the condensate drainage channel when the cleaning device is in use. The shroud may be arranged to surround a portion of the cleaning rod when the shield is moved from the first position to the second position. The shroud may be arranged to cover (protect) a portion of the cleaning rod when the shield is in the first position. For example, the shroud may be an annular element on the end of the shield. The shape of the shroud may be configured to cooperate with a surface of the entry port. The shroud defines a recess in which the entry port may be received when the shaft is advanced towards the orifice. The recess may have a shape that is complementary to a shape of the entry port, so that all or a portion of the entry port may be received in the recess. When the shaft is moved along the channel towards the orifice, the shroud may engage (cooperate with) a sidewall of the entry port, such that a portion of the entry port being received in the recess. For example, the entry port of a condensate drainage channel is often cone- or dome-shaped. This may serve to locate (e.g. centre) the shield over the entry port, to align the cleaning rod with the orifice. This may facilitate insertion of the cleaning rod into the orifice. This may also avoid damage to the cleaning rod, which could occur due to misalignment of the cleaning rod with the orifice.

In some embodiments, the shield may include an aperture, such that the cleaning rod passes through the aperture when the shield is moved from the first position to the second position. When the shield is in the second position, a portion of the cleaning rod may protrude through the aperture, such that it can be inserted into the orifice. The aperture may serve to guide the cleaning rod as the shield is moved from the first position to the second position. This may serve to ensure alignment of the cleaning rod with the orifice. The aperture may also serve to restrict access to the cleaning rod when the shield is in the first position, to avoid damage to the cleaning rod. The aperture may be formed in a protective surface of the shield. In this manner, portions of the cleaning rod which are located behind the protective surface (i.e. which do not protrude through the aperture) may be covered (protected) by the shield. In some examples, the aperture may include one or more tabs, which are arranged to engage the cleaning rod as it passes through the aperture. This may further improve alignment of the cleaning rod.

In some embodiments, when the shield is in the first position, the cleaning rod does not protrude through the aperture. In this manner, when the shield is in the first position, the cleaning rod may be located entirely behind the protective surface of the shield. This minimise the risk of damage to the rod when it is not in use.

In some embodiments, the cleaning device may further include a locking mechanism for locking the position of the rod carrier relative to the cap (or the shaft relative to the channel). The locking mechanism may serve to prevent the shaft from being accidentally moved along the channel. This may serve to prevent damage to the cleaning rod. The locking mechanism may include any suitable mechanism for fixing the position of the shaft relative to the cap, to prevent movement of the shaft along the channel. For example, the locking mechanism may include a clamp located in/on the cap, the clamp being closable around the shaft to lock the position of the shaft relative to the channel. The shaft may include an engagement feature which is engageable in the locking mechanism to lock the position of the shaft relative to the channel.

In some embodiments, the cleaning device may further include a handle, the handle being engageable with a proximal end of the shaft to move the shaft along the channel. For example, one of the handle and the proximal end of the shaft may include a key, whilst the other may include a slot or recess in which the key is receivable. Engagement between the handle and the shaft may enable motion of the handle to be transmitted to the shaft. This may facilitate moving the shaft along the channel. For example, where the shaft is moved along the channel by rotating the shaft (e.g. where the shaft is threadingly engaged in the channel), the handle may facilitate application of torque to the shaft to rotate the shaft. When it is desired to operate the cleaning device, the handle may be engaged with the shaft. Following use of the cleaning device, the handle may be removed, to avoid accidentally operating the cleaning device. Alternatively, the handle may be left in place on the shaft when the cleaning device is not in use. In embodiments without a handle, the shaft may comprises an engagement portion configured to connect to an actuator. For example, the engagement portion may be flattened regions on the outer surface of the shaft that are engageable by a spanner or the like.

In some embodiments, the cap may include a sleeve portion, the sleeve portion defining a passageway in which the proximal end of the shaft is disposed when the shaft is inserted into the channel, and an end of the handle may be insertable into the sleeve portion to engage the proximal end of the shaft. The passageway in the sleeve portion may constitute an extension of the channel in the cap. The sleeve portion may serve to guide the handle into engagement with the proximal end of the shaft. The sleeve portion may also serve to hold the handle in place on the shaft. For example, the sleeve portion may be dimensioned to form an interference fit with the handle when the handle is inserted into the sleeve portion. The sleeve portion may be integrally formed with the cap. Where the cap is formed of a first part and a second part, the sleeve portion may be formed on the first part or the second part.

In some embodiments, a hole may be disposed in a sidewall of the sleeve portion, such that a locking device may be insertable through the hole to prevent engagement between the handle and the proximal end of the shaft. For example, the hole may arranged such that it is located above the proximal end of the shaft when the shaft is inserted into the channel. In some cases, a pair of holes may be formed in the side wall of the sleeve portion. A locking device may for example include a bar or a shackle of a padlock. A bar or shackle may be inserted through the hole or holes, to form an obstruction in the passageway. The obstruction may act to prevent engagement between the handle and the shaft when the handle is inserted into the sleeve portion. This may prevent the handle from being used to actuate (e.g. rotate) the shaft. In this manner, when a locking device is inserted through the hole/holes in the sleeve portion, accidental actuation of the shaft via the handle may be avoided. The sleeve portion may be configured to hold the handle in a position spaced apart from the proximal end of the shaft when a locking device is inserted into the hole/holes.

In some embodiments, the shaft may include an indicator for indicating when the cleaning rod is inserted into the orifice. The indicator may serve to visually indicate to a user that the cleaning rod is inserted into the orifice. This may be useful, as it can be difficult to tell whether the cleaning rod is inserted into the orifice when the cleaning device is mounted on the condensate removal device. By indicating to the user when the cleaning rod is in the orifice, this may avoid the user applying excessive force to the cleaning device (e.g. to the shaft) which could damage the cleaning device. In one example, the indicator may be arranged such that, when the indicator is aligned with an opening of the channel, the cleaning rod is positioned within the orifice. Alternatively, the cap may include a second indicator, such that when the indicator on the shaft and the indicator on the cap are aligned, the cleaning rod is inserted into the orifice. The indicator may be any suitable type of visual indicator. For example, the indicator may include a line, groove or other marking on the shaft.

In some embodiments, the cap may include a threaded surface for mounting the cap on the access opening, the threaded surface being engageable with a threaded surface on the condensate removal device. In this manner, the cap may be screwed onto the condensate removal device. This may facilitate mounting the cleaning device on the condensate removal device. In some examples, the threaded surface may include a sealing thread which is configured to form a seal when engaged with the threaded surface on the condensate removal device. In this manner, the threaded connection between the cap and the condensate removal device may serve to prevent condensable gas and/or condensate from escaping via the access opening. The threaded surface on the cap may serve as a primary alignment means for aligning the cleaning rod with the orifice in the longitudinal direction. Other parts of the cleaning device may be positioned and oriented with respect to the threaded surface, so that when the cap is mounted in the access opening, the cleaning rod is aligned with the orifice. For example, where the cap includes a channel, the location and orientation of the channel may be set relative to the threaded surface. In some examples, the threaded surface on the cap may be aligned parallel to the longitudinal direction when the cap is mounted in the access opening. This may facilitate manufacture (e.g. machining) of the cleaning device, as the cleaning device may be manufactured using the longitudinal axis as a principal axis.

In some embodiments, the cleaning device may further include a magnetic debris collection element. The magnetic debris collection element may be a structure configured to impede entry of magnetic debris into the condensate drainage channel. The magnetic structure may include one magnet or multiple magnets. The term "magnet" as used herein is understood to encompass any element or arrangement which can be used to effect or generate a magnetic field. As such, it may include permanently magnetic materials, i.e. intrinsic magnets, or materials or structures in which a magnetic field can be induced, e.g. an electromagnet. Permanent magnetic material is preferred, for simplicity of construction. Suitable magnetic materials include, for example, samarium-cobalt alloys, as these may be suitable for use in the environment inside a condensate removal device.

When a condensate removal device is in use, magnetic debris may be carried into the device with the flow of condensable gas and condensate. Magnetic debris may include, for example, magnetite or other ferrous-ferric oxides. A magnetic field produced by the magnetic structure may act to deflect the magnetic debris away from the entry port of the condensate drainage channel, to prevent the magnetic debris from entering the condensate drainage channel. Alternatively, the magnetic field produced by the magnetic structure may act to attract the magnetic debris towards the cleaning device, such that the magnetic debris is retained on a retention surface of the cleaning device. The retention surface may be a surface of the magnetic structure.

Where the cleaning device includes a shield, a portion or all of the magnetic structure may be disposed on the shield. The magnetic structure may be disposed on an orifice-facing surface of the shield. An orifice-facing surface refers to a surface that faces towards the orifice when the cleaning device is mounted on the condensate removal device. Where the shield includes an engagement surface, the engagement surface may be formed by a surface of the magnetic structure. For example, the magnetic structure may form all or part of the shroud. Where the shield includes an aperture, the magnetic structure may be disposed around the aperture, to enable the cleaning rod to pass through the aperture. The magnetic structure may be a ring-shaped magnet that is disposed around the aperture. Alternatively, the magnetic structure may include multiple magnets that are disposed around the aperture. The magnetic structure may thus act as part of the shield, and serve to cover a portion of the cleaning rod when the cleaning rod protrudes through the aperture.

In some cases, a portion or all of the magnetic structure may be formed on the shaft. For example, the magnetic structure may be formed on an orifice-facing surface of the shaft. The magnetic structure may be disposed on the end of the shaft where the cleaning rod is disposed. The magnetic structure may be disposed around the cleaning rod. For example, the magnetic structure rod may be a ring-shaped magnet that is disposed around the cleaning rod, or multiple magnets that are disposed around the cleaning rod.

In some cases, a portion or all of the magnetic structure may be formed on the cap. For example, the magnetic structure may be formed on an orifice-facing surface of the cap. The orifice-facing surface of the cap may be disposed around an opening of the channel in the cap. In this manner, the magnetic structure may be disposed around the opening of the channel facing towards the orifice. Thus, the shaft may pass through the magnetic structure when it is moved through the channel towards the orifice. The magnetic structure may include a ring-shaped magnet dispose around the opening of the channel, or multiple magnets arranged around the opening.

Of course, the magnetic structure may include portions which are formed on one or more of the cap, shaft and shield.

The cleaning device of the invention may form part of a complete condensate removal device for mounting in a pipeline. The condensate removal device may comprise: an inlet connectable to the pipeline to receive a condensable gas flow; an outlet connectable to the pipeline downstream of the inlet, the inlet and outlet being disposed on a pipeline axis through the device; a condensate drainage channel providing fluid communication between the inlet and outlet, the condensate drainage channel having an entry port from which it extends in the longitudinal direction, and an orifice that is occludable by condensate flow therethrough to restrict condensable gas flow therethrough; an access opening facing the entry port, the access opening being offset from the pipeline axis; and a cleaning device according to the first aspect of the invention, the cleaning device being mountable on the access opening; wherein, when the cleaning device is mounted on the access opening, the shaft is aligned with the orifice in the longitudinal direction, and the cleaning rod is insertable into the orifice by moving the rod carrier in the longitudinal direction. Thus, when the cleaning device is mounted on the access opening, the cleaning rod may be inserted into the orifice by moving the cleaning rod (e.g. shaft) in the longitudinal direction towards the orifice.

The condensate drainage channel may be at a normal or oblique angle with respect to the axis of the pipeline. This may enable the condensate drainage channel to be accessed and/or cleaned while the condensate removal device is mounted in the pipeline. The orifice may be disposed at the entry port of the condensate drainage channel, or further along the condensate drainage channel. The orifice may include a constricted passage in the condensate drainage channel, e.g. it may form the narrowest part in the condensate drainage channel. In some cases, the orifice may form part of a venturi, i.e. the condensate drainage channel may increase in cross-sectional area away from (i.e. downstream from) the orifice. The access opening may be a sealable opening providing access to the condensate drainage channel. The access opening is disposed outside of, i.e. offset from, the pipeline axis. Providing the access opening offset from the pipeline axis, e.g. on a side surface of the device that runs alongside the pipeline axis, may permit maintenance to be performed whilst the device is mounted in the pipeline. In some cases, the cleaning device may be permanently mounted on the access opening (e.g. the cap may be welded to the condensate removal device). In other cases, the cleaning device may be reversibly mountable on the access opening.

The condensate removal device may comprise a unitary body that houses an inlet chamber in fluid communication with the inlet and an outlet chamber in fluid communication with the outlet, wherein the condensate drainage channel provides fluid communication between the inlet chamber and outlet chamber. The entry port may be formed in a downstream wall of the inlet chamber. The entry port may include a portion of the downstream wall having a convex shape with an opening of the entry port at its apex. For example, the downstream wall may have one or more sloping walls angled towards the apex. The sloping walls may be straight or curved. In one embodiment the downstream wall includes a conical section, with the opening of the entry port at its tip. This configuration may reduce the tendency for particles in the condensate to congregate in the entry port and/or constricted passage, as they may instead gather around the base of the sloping walls. This configuration may also serve to centre the cleaning device on the entry port.

The inlet chamber may comprise a drainage sub-chamber and a filter sub-chamber in fluid communication with one another, the drainage sub-chamber being disposed downstream of the filter sub-chamber. The entry port may be located in the drainage sub-chamber. The filter sub-chamber may include a filter (e.g. a basket-type filter) arranged to prevent debris carried by the condensable gas or condensate into the device from reaching the entry port. By filtering out debris in this manner, the time period between maintenance inspections can be increased.

In some embodiments, the condensate removal device may further include a magnet disposed between the inlet and the entry port. The magnet may serve to prevent magnetic debris from entering the condensate drainage passage.

Herein the term "distal" is used to refer to an end of the cleaning device or a part thereof which is located closer to the orifice in an insertion direction of the cleaning rod into the orifice (when the cleaning device is mounted on the condensate removal device). The term "proximal" is used to refer to an end of the cleaning device or a part thereof which is locater further away from the orifice in the insertion direction (when the cleaning device is mounted on the condensate removal device). For example, when the cleaning device is in use, the distal end of the shaft may be located closer to the orifice than the proximal end of the shaft. The insertion direction (or longitudinal direction) corresponds to the direction along which the cleaning rod is moved to insert it into the orifice.

BRIEF DESCRIPTION OF THE DRAWINGS

Examples of the invention are discussed below with reference to the accompanying drawings, in which:

FIGS. 8A and 8B show perspective views of a handle and a shaft of the cleaning device of FIG. 6;

DETAILED DESCRIPTION; FURTHER OPTIONS AND PREFERENCES

Figure 1:
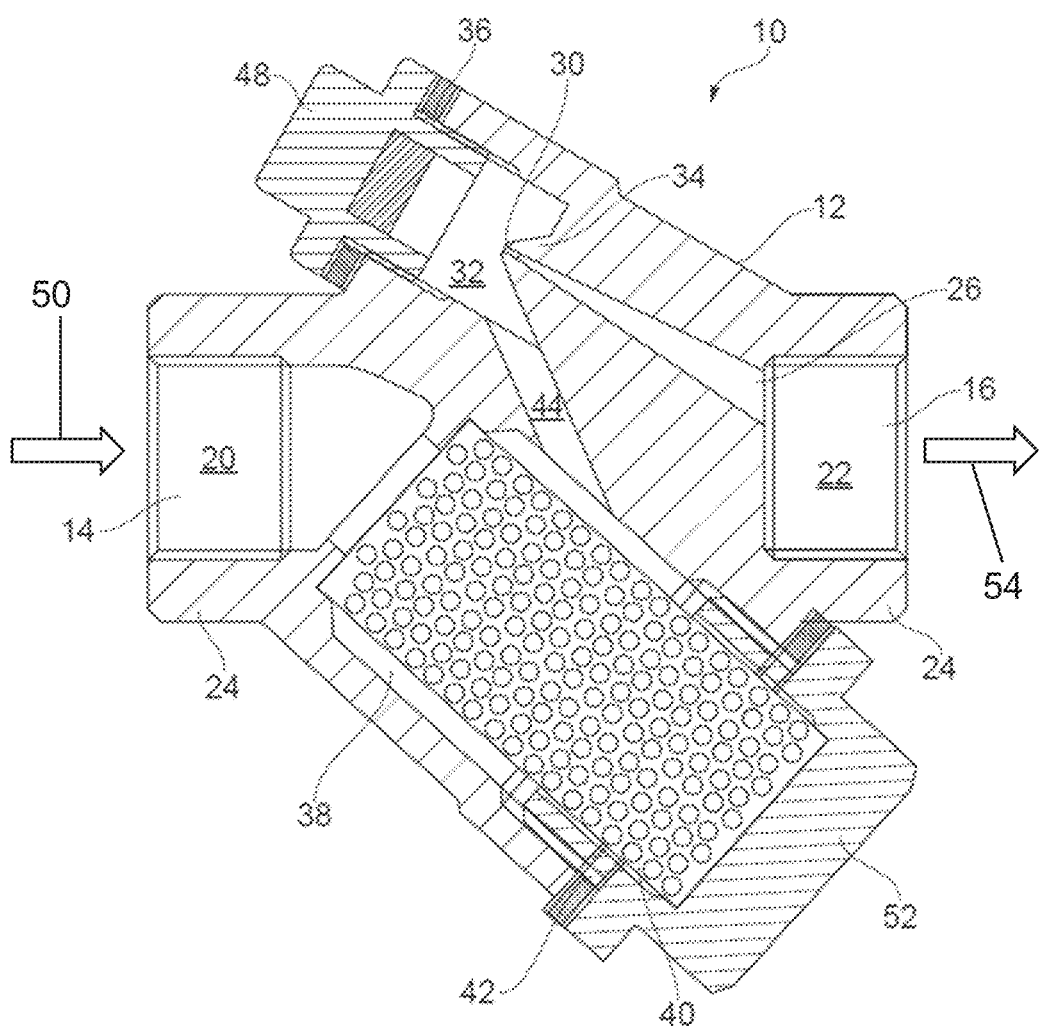
FIG. 1 shows a schematic cross-sectional side view of a condensate removal device with which a cleaning device or cleaning tool of the invention may be used.

FIG. 1 shows an example of a condensate removal device 10 (also referred to as a steam trap) with which a cleaning tool or cleaning device according to an embodiment of the invention may be used.

The steam trap 10 comprises a unitary body 12 cast from stainless steel or other suitable material. The body 12 has an inlet 14 and an outlet 16 formed on opposite sides thereof. The inlet 14 and outlet 16 are apertures leading into an inlet bored region 20 and an outlet bored region 22 respectively.

The body 12 is adapted to be connected in a pipeline (not shown). The parts 24 of the body 12 surrounding the inlet 14 and outlet 16 may be arranged to connect to external piping. For example, the parts may be arranged to form any one or more of a screwed, socket weld, and flanged to an adjacent piece of piping.

The inlet 14 is arranged to receive condensable gas and/or condensate from the external pipeline. The steam trap 10 includes a linear condensate drainage channel 26 which is arranged to permit condensate to flow therethrough and escape through the outlet 16, whilst restricting or preventing the escape of the condensable gas. The outlet 16 may be exposed to a lower pressure than the inlet 14, so that the condensable gas and condensate received in the inlet 14 are drawn into the condensate drainage channel 26. The arrow labelled with reference numeral 50 in FIG. 1 illustrates the direction of flow of condensable gas and condensate into the inlet 14. The arrow labelled with reference numeral 54 in FIG. 1 illustrates the direction of flow of condensate out of the outlet 16.

The condensate drainage channel 26 extends away from the outlet 16. The condensate removal channel 26 comprises a constricted passage 30 (also referred to as an orifice), i.e. the narrowest part of the condensate drainage channel 26. In this example, the constricted passage 30 is at the upstream end of the condensate drainage channel 26, but this need not be essential; it may be formed further downstream in the condensate drainage channel 26. As it extends away from the constricted passage 30 towards the outlet 16, the condensate drainage channel 26 flares open, i.e. gradually increases in cross-sectional area. When hot condensate is forced through the constricted passage 30 into the condensate drainage channel 26, the pressure drop across the constricted passage 30 causes flash boiling of the condensate, which in turn creates a variable restriction in the flow capacity of the condensate drainage channel 26 which acts to inhibit passage of condensable gas through the constricted passage 30. The diameter of the constricted passage 30, which may be constant, is selected in view of the properties of the pipeline (e.g. differential pressure between the inlet and outlet, composition of the condensable gas, etc.) such that it permits the discharge of condensate at a desired rate. The condensate drainage channel 26 extends in a direction that is at an oblique angle with respect to the inlet and the outlet (i.e. with respect to the direction indicated by arrows 50, 54)

The condensate drainage channel 26 has an upstream opening located in a drainage sub-chamber 32, which is in fluid communication with the inlet 14 to receive the condensable gas and/or condensate. The surface of the drainage sub-chamber 32 surrounding the upstream opening of the condensate drainage channel 26 forms an entry port 34. The entry port 34 is shaped as a cone extending away from the outlet 16. The convex surface of the cone (i.e. the sloping surfaces leading up to the upstream opening) may assist in prevent debris from settling over the condensate drainage channel 26 or the constricted passage 30. The drainage sub-chamber 32 is accessible from the outside via an access opening 36, which is located opposite the entry port 34. The access opening 36 may be used for maintenance, e.g. to clean the constricted passage 30, without removing the steam trap 10 from the pipeline. The access opening 36 is offset from the inlet and the outlet, so that it may be opened when the condensate removal device 10 is mounted in a pipeline. In use, the access opening 36 may be closed by a cap or plug 48. The cap or plug may be threadingly engaged with the internal surface of the drainage sub-chamber 32.

In some cases, the inlet 14 may be in direct communication or formed integrally with the drainage sub-chamber 32. However, in the example shown, the condensable gas and/or condensate travel from the inlet 14 to the drainage sub-chamber 32 via a filter sub-chamber 38. The filter sub-chamber 38 is a hollow region (e.g. a bored region) adapted to receive a strainer 40. The strainer 40 comprises a perforated sleeve that fits in the filter sub-chamber 38 to restrict the passage of debris into the drainage sub-chamber 32. A fine strainer mesh may also be used, e.g. reinforced by the perforated sleeve. The filter sub-chamber 38 is oriented at an oblique angle with respect to the inlet and outlet, so that it is accessible from the outside via an opening 42. The opening 42 may be used for maintenance, e.g. to clean or replace the strainer 40, without removing the steam trap 10 from the pipeline. In use, the opening 42 is closed by a cap or plug 52. The filter sub-chamber 38 is in fluid communication with the drainage sub-chamber 32 via a passageway 44.

Figure 2A:
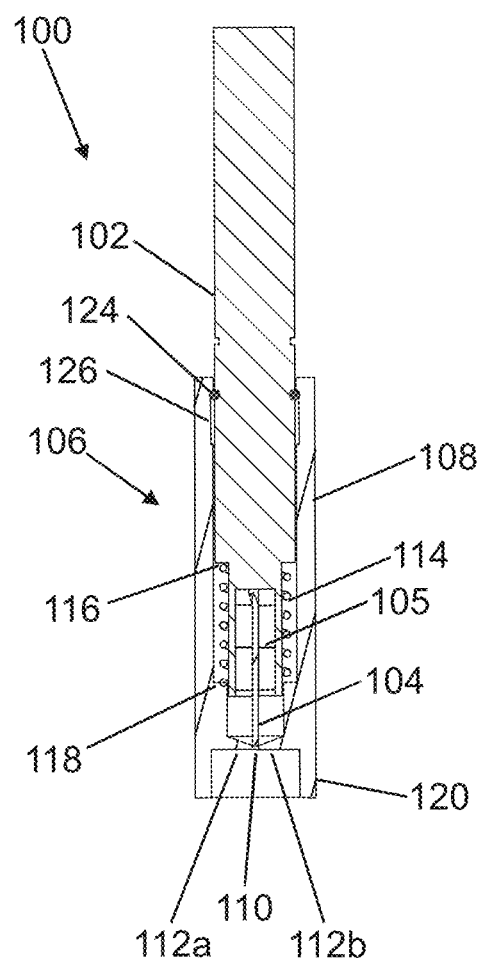
FIGS. 2A and 2B show schematic cross-sectional side views of a cleaning tool that is an embodiment of the invention, in a first position and in a the second position, respectively.
Figure 2B:
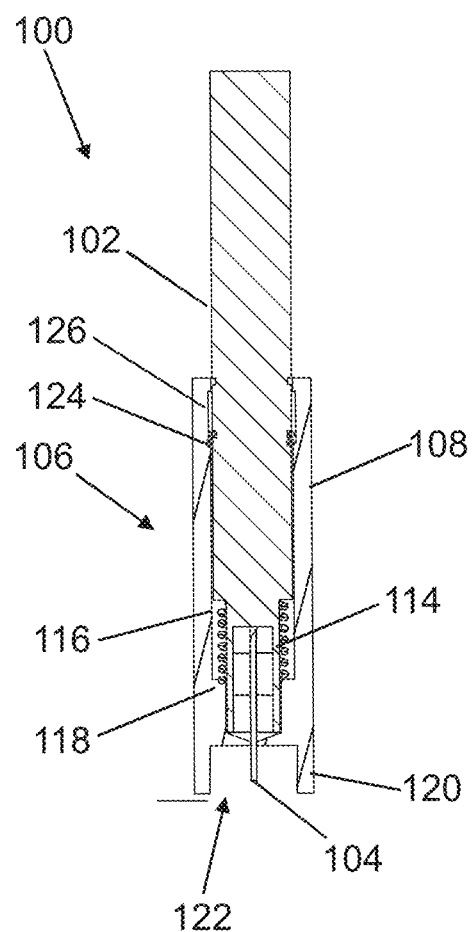

FIGS. 2A and 2B show cross-sectional side views of a cleaning tool 100 that is an embodiment of the invention. For clarity of illustration, some of the reference numerals shown in FIG. 2A are omitted from FIG. 2B. The cleaning tool 100 is insertable into an access opening of a condensate removal device (steam trap), to clean an orifice (constricted passage) in a condensate drainage channel of the condensate removal device. For example, the cleaning tool 100 may be inserted through access opening 36 of condensate removal device 10, to clean the constricted passage 30.

The cleaning tool 100 includes a shaft 102 having a cleaning rod 104 mounted at a first (distal) end thereof. The shaft 102 is generally cylindrical, and extends in a longitudinal direction. The cleaning rod 104 is mounted on the end of the rod carrier, which in this example is a shaft 102 that is inserted into the access opening of the condensate removal device. The cleaning rod 104 is dimensioned to fit in the orifice of the condensate removal device. In particular, its outer diameter may be slightly smaller than the diameter of the orifice, so that the cleaning rod may 104 may fit in the orifice. For example, the outer diameter of the cleaning rod 104 may be about 0.005 mm smaller than the diameter of the orifice. The length of the cleaning rod 104 is adapted so that the cleaning rod may pass through the orifice when the cleaning rod 104 is inserted into the condensate drainage channel, e.g. via an entry port of the condensate drainage channel. The cleaning rod 104 may be a length of wire secured to the end of the shaft 102. Alternatively, the cleaning rod 104 may be integrally formed with the shaft 102, e.g. the cleaning rod 104 and shaft 102 may be machined as a single part. The cleaning rod 104 may be made from tempered high-carbon steel (known as spring steel). In some cases, a drill blank may be used as the cleaning rod 104. The cleaning rod may be attached by press-fitting or otherwise securing an insert 105 into a recess formed in a distal portion of the shaft. As discussed below, the shaft may have a rod holder portion mounted at its distal end. The insert 105 may be mounted in the rod holder.

The cleaning tool 100 also includes a shield 106 which is mounted on the shaft 102 and which is movable relative to the shaft 102 between a first position and a second position. The shield 106 is mounted on the first end of the shaft 102 having the cleaning rod 104. The shield 106 includes a sleeve portion 108 in which the first end of the shaft 102 is received. The sleeve portion 108 of the shield 106 is longitudinally slidable relative to the shaft 102. When the shield 106 is in the first position, a shorter length of the shaft 102 is located in the sleeve portion 108 than when the shield 108 is in the second position. A distal end of the shield 106 includes an aperture 110 which is aligned with the cleaning rod 104 in the longitudinal direction. The aperture 110 is arranged such that, when a relative position of the shield 106 and the shaft 102 changes from the first position to the second position, a portion of the cleaning rod 104 passes through the aperture 110.

FIG. 2A illustrates the cleaning tool 100 when the shield 106 is in the first position, and FIG. 2B illustrates the cleaning tool 100 when the shield 106 is in the second position. As can be seen in FIG. 2A, when the shield 106 is in the first position, the cleaning rod 104 does not protrude through the aperture 110, i.e. the cleaning rod 104 is contained (e.g. wholly disposed) within the shield 106. In this manner, in the first position, the cleaning rod 104 is covered and protected by the shield 106. As can be seen in FIG. 2B, when the shield is in the second position, a portion of the cleaning rod 104 extends through the aperture 110 and is exposed. In this configuration, the exposed portion of the cleaning rod 104 may be inserted into an orifice of a condensate removal device to clean the orifice. The aperture 110 may serve to guide the cleaning rod 104, as the shield 106 is moved from the first position to the second position. In the example shown, the aperture 110 is formed by a radial projection or shelf, e.g. formed by a pair of tabs or "teeth" 112a, 112b which extend radially from sidewalls of the shield 106. The tabs 112a, 112b are arranged to engage the cleaning rod 104 as the cleaning rod 104 passes through the aperture 110. This may serve to prevent lateral motion of the cleaning rod 104, to ensure accurate alignment of the cleaning rod 104 with the orifice.

The shield 106 is biased towards the first position by means of a spring 114. The spring 114 is mounted in the sleeve portion 108 of the shield 106, between a first flange surface 116 on the shaft 102 and a second flange surface 118 on the sleeve portion 108 of the shield 106. As the shield 106 is moved towards the second position, the spring 114 is compressed between the first flange surface 116 and the second flange surface 118 (as the distance between the first and second flange surfaces becomes smaller). This causes the spring 114 to exert a restoring force on the shield 106, which urges it to return to the first position. In this manner, when the cleaning rod 104 is not being used, the shield 106 may automatically return to the first position to protect the cleaning rod 104. Other means for biasing the shield 106 towards the first position may also be used.

The shield 106 further includes a shroud 120 at a distal end thereof. The shroud 120 includes an annular piece of material that surrounds the aperture 110, and defines a recess 122. When the shield 106 is in the second position, a portion of the cleaning rod 104 is located in the recess 122. The recess 122 is arranged to receive an entry port of a condensate drainage channel. For example, the entry port may have a conical or dome shape, which is receivable in the recess 122 defined by the shroud 120. The shroud may be configured to centre the cleaning tool 100 over an entry port.

The shaft 102 and shield 106 have inter-engaging features that cooperate to limit relative longitudinal motion between the shaft 102 and the shield 106. The inter-engaging features may be located towards a proximal end of the shield 106. For example, the shaft 102 includes a radial protrusion 124 for limiting the range of motion of the shield 106 relative to the shaft 102. The protrusion 124 is slidably retained in a longitudinal groove 126 formed on an inner wall of the sleeve portion 108 of the shield 106. The groove 126 and protrusion 124 may extend around all or part of the circumference of the shield 124 and shaft 102. The length of the groove 126 in the longitudinal direction determines the range of motion of the shield 106 relative to the shaft 102. The groove 126 is arranged so that the protrusion 124 abuts against a first end of the groove 126 when the shield 106 is in the first position, and the protrusion 124 abuts against a second end of the groove 126 when the shield 106 is in the second position. In this manner, movement of the shield 106 relative to the shaft 102 is limited to movement between the first position and the second position. Engagement between the protrusion 124 and the groove may prevent the shield 106 from being pulled off an end of the shaft 102. In the example shown, the protrusion 124 is a circular clip which mounted in a circumferential slot on the outer surface of the shaft 102.

In use, the cleaning tool 100 may be moved towards the entry port of a condensate drainage channel. The shield 106 may initially be in the first position, due to the biasing of spring 114. The shroud 120 may then engage a surface of the entry port, with a portion of the entry port being received in the recess 122. This may serve to align the cleaning tool 100 (in particular the cleaning rod 104) with the entry port. The shape of a distal end of the shroud 120 may be configured to cooperate or mate with the entry port, e.g. the conical surface of entry port 34. The cooperating shapes of the shroud 120 and the entry port may serve to guide the cleaning tool 100 as it is moved towards the orifice, so that the cleaning tool 100 is centred over the entry port. The shroud 120 may thus enable "self-centring" of the cleaning tool 100 using the conical surface of the entry port. Once the shroud 120 is engaged with the entry port, further motion of the shaft 102 towards the entry port may cause the shield 106 to move from the first position to the second position. In this manner, the cleaning rod 104 may be inserted into the condensate drainage channel and through the orifice, to clear any debris from the orifice.

Figure 3A:
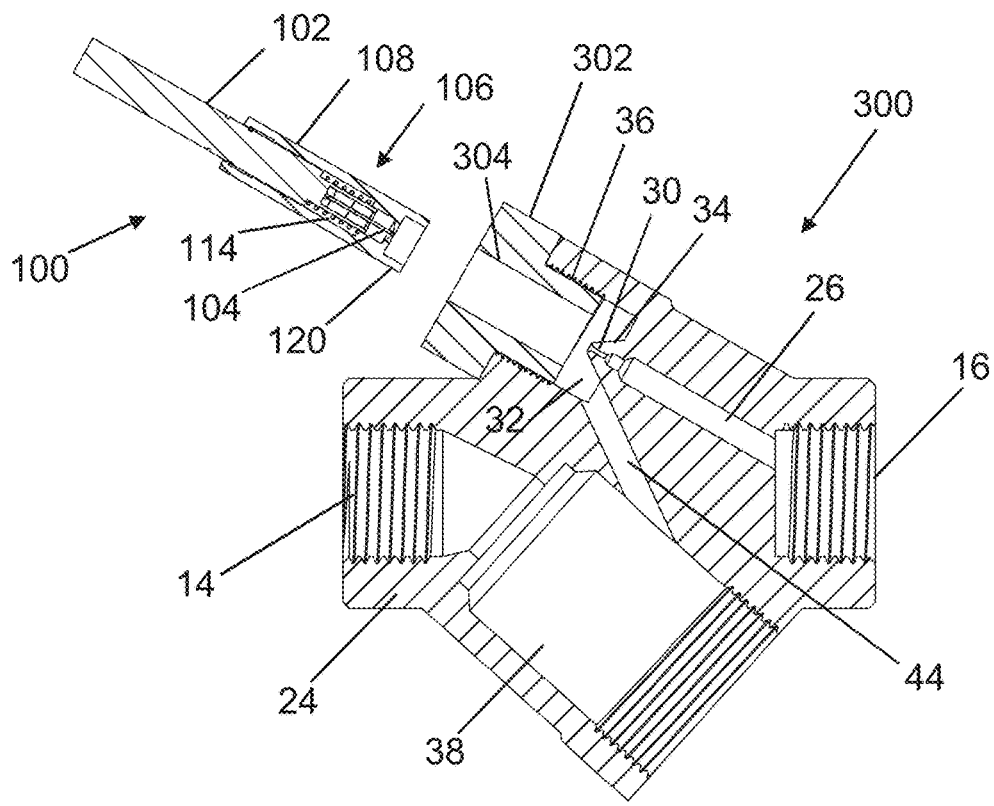
FIGS. 3A, 3B and 3C illustrate a use of the cleaning tool of FIGS. 2A, 2B with a condensate removal device.
Figure 3B:
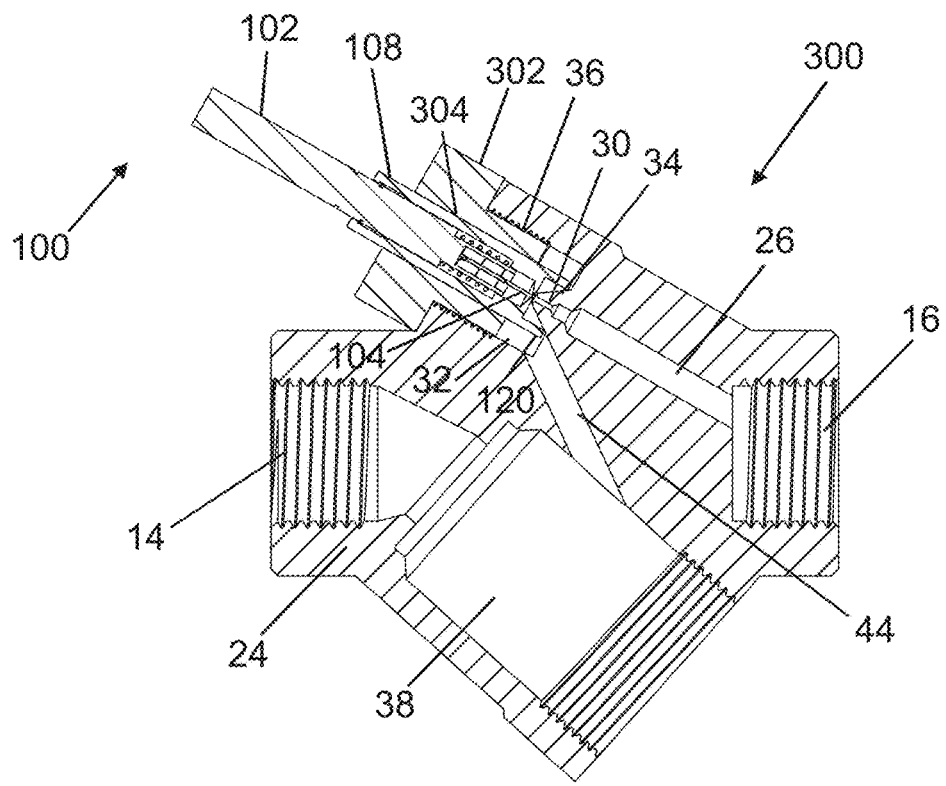
Figure 3C:
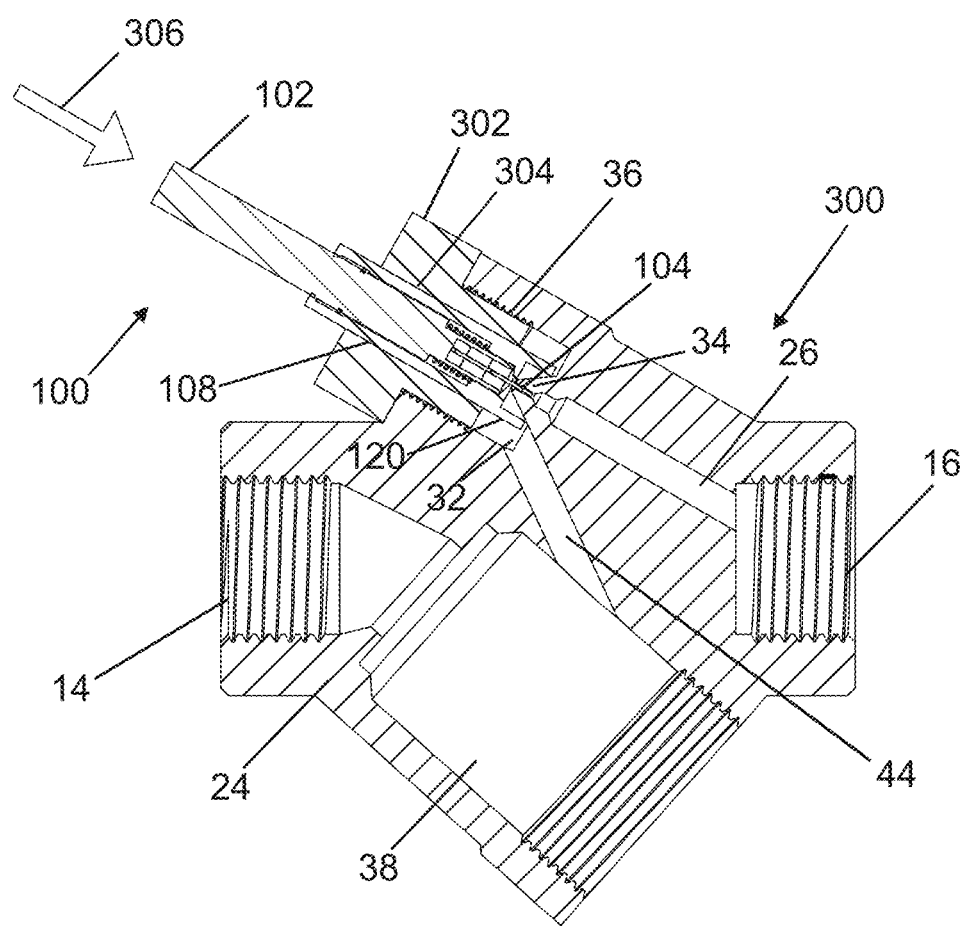

FIGS. 3A-3C illustrate use of the cleaning tool 100 with a condensate removal device 300. The condensate removal device 300 has a similar configuration to the condensate removal device 10 described in relation to FIG. 1. Reference numerals corresponding to those used in FIG. 1 are used in FIGS. 3A-3C to indicate features of the condensate removal device 300 described above in relation to FIG. 1. In FIGS. 3A-3C, a cap 302 is mounted on the access opening 36 of the condensate removal device 300. The cap 302 includes a threaded surface that is threadingly engaged with the internal surface of the drainage sub-chamber 32. The threaded surface of the cap 302 may be aligned in the access opening 36 with an insertion direction for inserting the cleaning rod 104 into the constricted passage 30. In this manner, the threaded surface of the cap 302 may act as a primary alignment means for aligning the cleaning tool 100 with the constricted passage 30. The cap 302 may, for example, replace cap 48 shown in FIG. 1. The cap 302 includes a channel 304 extending therethrough, which provides fluid communication between the drainage sub-chamber 32 and the outside of the condensate removal device 300. The channel 304 is sized so that the cleaning tool 100 is insertable through the channel 304. The diameter of the channel 304 substantially matches an outer diameter of the shield 106, such that an interference fit is formed between the shield 106 and the channel 304 when the cleaning tool 100 is inserted into the channel 304. Together, the cleaning tool 100 and the cap 302 may form a cleaning device that is an embodiment of the invention.

In FIG. 3A, the cleaning tool 100 is not yet inserted into the channel 304 of the cap 302. The shield 106 is in the first position (due to biasing of spring 114), so that the cleaning rod 104 is covered by the shield 106. This may avoid damage to the cleaning rod 104 as the cleaning tool 100 is approached towards the channel 304. In FIG. 3b, the cleaning tool 100 is inserted into the channel 304. An interference fit is formed between the shield 106 and the channel 304, such that the channel 304 guides the cleaning tool 100 as the cleaning tool 100 is moved along the channel 304. The shield 106 remains in the first position as the cleaning tool 100 is inserted into the channel 304. As the cleaning tool 100 is inserted into the channel 304, the shroud 120 of the shield engages sidewalls of the conical entry port 34, as shown in FIG. 3b. This serves to align the cleaning tool 100 with the opening of the condensate drainage channel 26, and to maintain the alignment while the cleaning rod 104 is inserted into the constricted passage 30. As can be seen in FIG. 3b, a portion of entry port 34 is received in the recess 122 defined by the shroud 120. Once the shroud 120 is engaged with the entry port 34, the shaft 102 may be moved in a longitudinal direction towards the entry port 34 to insert the cleaning rod into the constricted passage 30.

FIG. 3c shows the cleaning tool 100 in a state where the shield 106 is in the second position and the cleaning rod 104 is inserted into the constricted passage 30. Arrow 306 in FIG. 3c illustrates the direction of a force applied by a user to the shaft 102 to insert the cleaning rod into the constricted passage 30. Engagement between the shroud 120 and the entry port 34 blocks further forward motion of the shield 106. Thus, as the shaft 102 is moved further forward along the channel 304 from the position shown in FIG. 3b, the shield 106 moves along the shaft 102 from the first position to the second position. This causes the cleaning rod 104 to pass through the aperture 110 in the shield 106 and into the constricted passage 30 of the condensate drainage channel 26 (FIG. 3c). As the cleaning rod 104 is inserted into the constricted passage 30, any debris present may be pushed out, so that it can be evacuated through the outlet 16 of the condensate removal device 300. In the example shown, the tabs 112a, 112b are abutted against a front surface of the entry port 34; however, in other examples, the tabs 112a, 112b need not necessarily abut against the front surface of the entry port 34.

Once the cleaning rod 104 has been inserted into the constricted passage 30, the cleaning tool 100 may be withdrawn from the condensate removal device 300. This may be done by pulling the shaft 102 in a direction opposite to arrow 306. This causes the cleaning rod 104 to pass back through the aperture 110 into the shield 106, and the shroud to disengage from the entry port 34. The shield 106 may return to the first position under action of the spring 114. In this configuration, the protrusion 124 on the shaft 102 may abut against the first end of the groove 126 on the shield 106, and transmit longitudinal motion of the shaft 102 to the shield 106.

Figure 4:
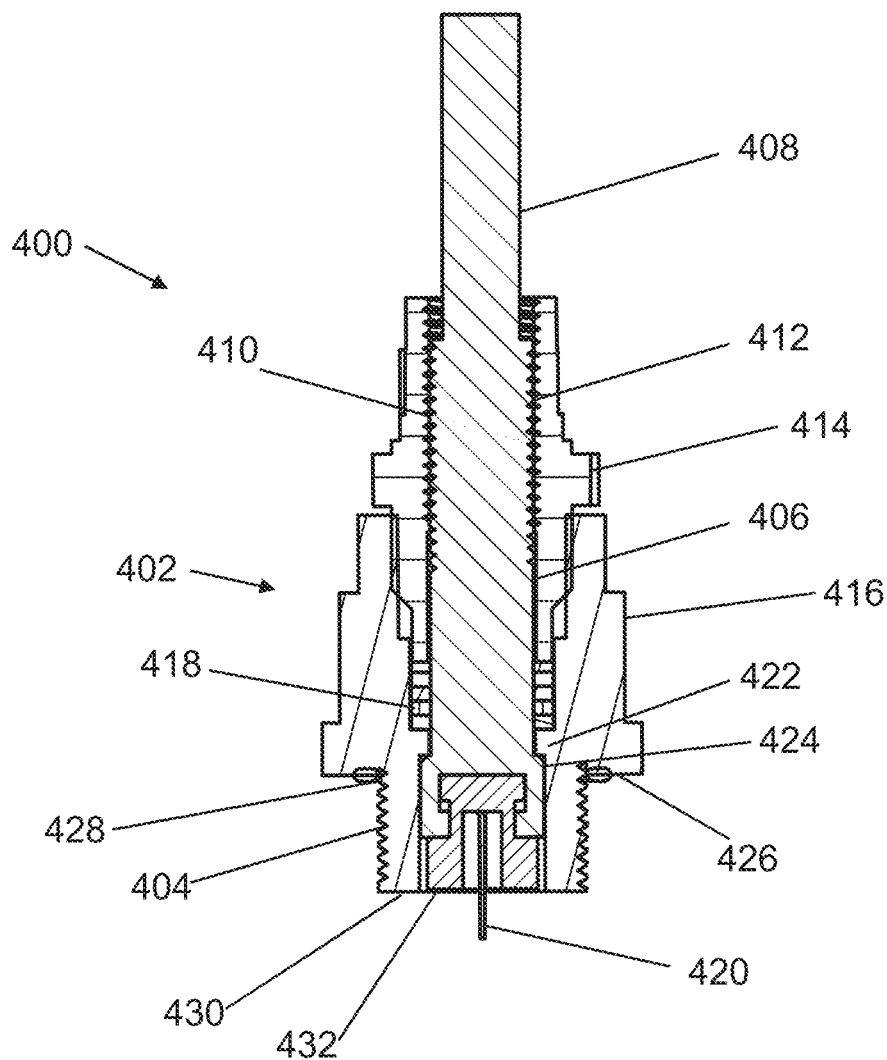
FIG. 4 shows a schematic cross-sectional side view of a cleaning device that is another embodiment of the invention.

FIG. 4 shows a cross-sectional side view of a cleaning device 400 that is another embodiment of the invention. Cleaning device 400 is mountable onto an access opening of a condensate removal device, to clean an orifice (constricted passage) in a condensate drainage channel of the condensate removal device. For example, the cleaning device 400 may be mounted on access opening 36 of condensate removal device 10, to clean constricted passage 30. Cleaning device 400 is an "online" cleaning device, meaning that it can be used to clean a condensate removal device which is in operation. In some examples, the cleaning device 400 may be permanently mounted on a condensate removal device, e.g. in place of cap 48 discussed above.

The cleaning device 400 includes a cap 402 which is mountable on an access opening of a condensate removal device. Cap 402 includes a threaded surface 404 which is threadingly engageable with a threaded surface in the access opening of a condensate removal device, for mounting the cap on the access opening. For example, cap 402 may be mounted on access opening 36 of condensate removal device 10, instead of cap 48. The cap 402 includes a channel 406 extending therethrough, in which a shaft 408 is disposed. The shaft 408 includes a first threaded surface 410, which is threadingly engaged with a second threaded surface 412 in the channel 406. Engagement between the first and second threaded surfaces 410, 412 translates rotational motion of the shaft 408 about its longitudinal axis into longitudinal motion of the shaft 408 along the channel. In this manner, this shaft may be moved forwards and backwards along the channel by rotating it relative to the cap 402.

A cleaning rod 420 is mounted on a first end of the shaft 408. Like cleaning rod 104 described above, the cleaning rod 420 is dimensioned to fit in the orifice of a condensate removal device. When the cleaning device 400 is mounted on the access opening of a condensate removal device, the first end of the shaft 408 is located near the end of the channel 406 which faces towards the orifice. In this manner, the cleaning rod 420 may be moved towards the orifice by moving the shaft 408 in a first (distal) direction along the channel 406, and the cleaning rod 420 may be moved away from the orifice by moving the shaft 408 in a second (proximal) direction along the channel 406.

The cap 402 is formed of a first (proximal) part 414 and a second (distal) part 416 which are connected together. For example, the first part 414 and the second part 416 may be connected together via a threaded connection (not shown). The channel 406 extends through both the first part 414 and the second part 416. The threaded surface 412 in the channel 406 is formed in the first part 414. The threaded surface 404 for mounting the cap 402 on an access opening is formed on the second part 416. A ring-shaped gasket 418 (e.g. O-ring) is located in the channel 406 in a space between the first part 414 and the second part 416, and is compressed between the first part 414 and the second part 416. The gasket 418 may be formed of any compressible material suitable for forming a seal (e.g. rubber, PTFE). The gasket 418 is disposed around the shaft 408, and arranged to form a seal between the shaft 408 and a wall of the channel 406. In some cases, multiple gaskets may be stacked on top of each other in the space between the first and second parts 414, 416 to form the seal. Compression of the gasket 418 may be adjusted by tightening or loosening the connection between the first part 414 and the second part 416, to adjust the strength of the seal. The first part 414 may thus act as a compressor which compresses the gasket 418 against the second part 416. The seal may serve to prevent condensable gas and/or condensate from escaping through the channel 406. The gasket 418 is arranged to enable motion of the shaft 408 along the channel 406, whilst maintaining the seal between the shaft 408 and the channel 406. In this manner, the seal between the shaft 408 and the channel 406 may be considered as a sliding seal.

The cleaning device includes a retraction limiter for limiting the retraction of the shaft 408 through the channel in the second (proximal) direction. In the example shown, the retraction limiter includes a radial lip 422 located within the channel 406. The lip 422 is arranged to engage a stopping surface 424 on the shaft 408 when the shaft is moved along the channel 406 in the second (proximal) direction, i.e. away from the orifice. The lip 422 is formed by a protrusion within the channel 406. The stopping surface 424 corresponds to ridge disposed at a junction between a distal portion of the shaft 408 having a larger diameter and a proximal portion of the shaft 408 having a smaller diameter. When the stopping surface 424 is engaged with the lip 422, the lip 422 acts to block further motion of the shaft 408 in the second direction. This serves to prevent the shaft 408 from being withdrawn through the gasket 418, so that the seal between the shaft 408 and the channel 406 is not broken when the shaft 408 is moved in the second direction. When the cleaning device 400 is mounted on the access opening, the shaft 408 may therefore be movable along the channel

406 between a first position where the stopping surface 424 is engaged with the lip 422, and a second position where the cleaning rod 420 is inserted into the orifice. In the configuration shown in FIG. 4, the stopping surface 424 is engaged with the lip 422. To assemble cleaning device 400, the shaft 408 may be inserted into the channel 406 via the end of the channel 406 which in use faces towards the orifice (i.e. the end of the channel 406 formed in the second part 416 of the cap 402).

The second part 416 of the cap 402 includes a sealing surface 426 for forming a seal around an access opening of a condensate removal device when the cap 402 is mounted on the access opening. The sealing surface 426 is configured to form a seal with a corresponding sealing surface on the condensate removal device. The sealing surface 426 is disposed around the threaded surface 404, such that as the cap 402 is screwed into the access opening, the sealing surface 426 may be brought into contact with the sealing surface on the condensate removal device. The seal may be formed by a gasket (e.g. O-ring) which is compressed between the sealing surface 426 on the cap 402 and the sealing surface on the condensate removal device when the cap 402 is mounted on the access opening. The gasket may be formed of any compressible material suitable for forming a seal (e.g. rubber, PTFE). In the example shown, a gasket 428 for forming the seal is provided on the sealing surface 426. The sealing surface 426 may include a groove or ridge for holding the gasket 428 in place. The seal between the sealing surface 426 and the condensate removal device may serve to prevent condensable gas and/or condensate from escaping from the access opening (e.g. through a space between the cap 402 and the access opening).

When the cleaning device 400 is mounted on the access opening of a condensate removal device, both the seal between the shaft 408 and the channel 406, and the seal between the sealing surface 426 and the condensate removal device may prevent condensable gas and/or condensate from escaping via the access opening. The cleaning device 400 may thus act as a plug/stopper for the access opening. In this manner, once the cleaning device 400 is mounted on the access opening, it may be left in place indefinitely and used to clean the orifice of the condensate removal device whilst the condensate removal device is in operation. In particular, cleaning device 400 may enable the orifice to be cleaned without having to stop the flow of condensable gas and condensate to condensate removal device. This may facilitate cleaning of the orifice, and reduce or avoid down-time associated with cleaning the orifice.

The second part 416 of the cap 402 includes a front face which is arranged to face towards the orifice when the cleaning device 400 is mounted on a condensate removal device. The shaft 408 also includes a front face 432 disposed around the cleaning rod 420, which is arranged to face towards the orifice when the cleaning device 400 is mounted on a condensate removal device. A magnetic structure may be mounted on one or both of the front faces 430, 432. The magnetic structure may serve to prevent magnetic debris from entering the condensate channel, as discussed in more detail below.

Figure 5A:
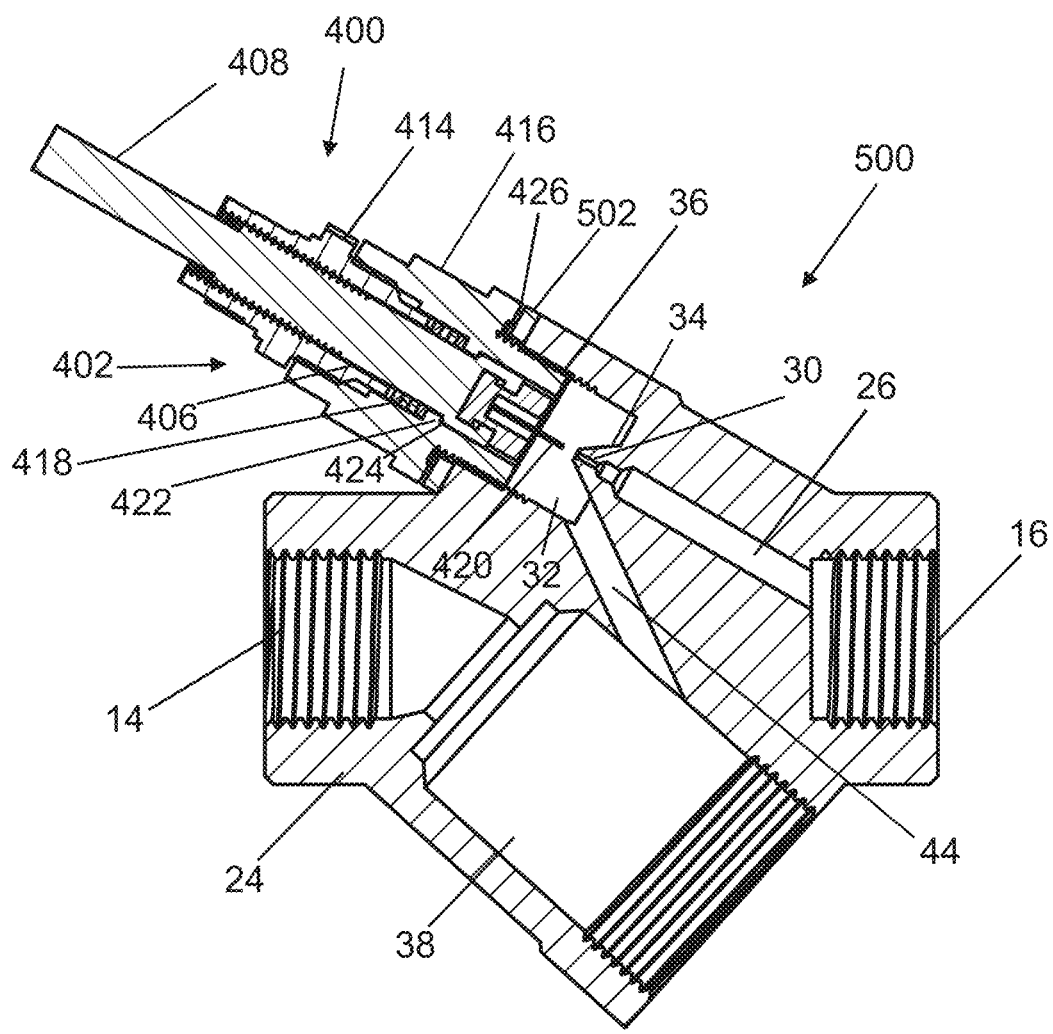
FIGS. 5A and 5B illustrate a use of the cleaning device of FIG. 4 with a condensate removal device.
Figure 5B:
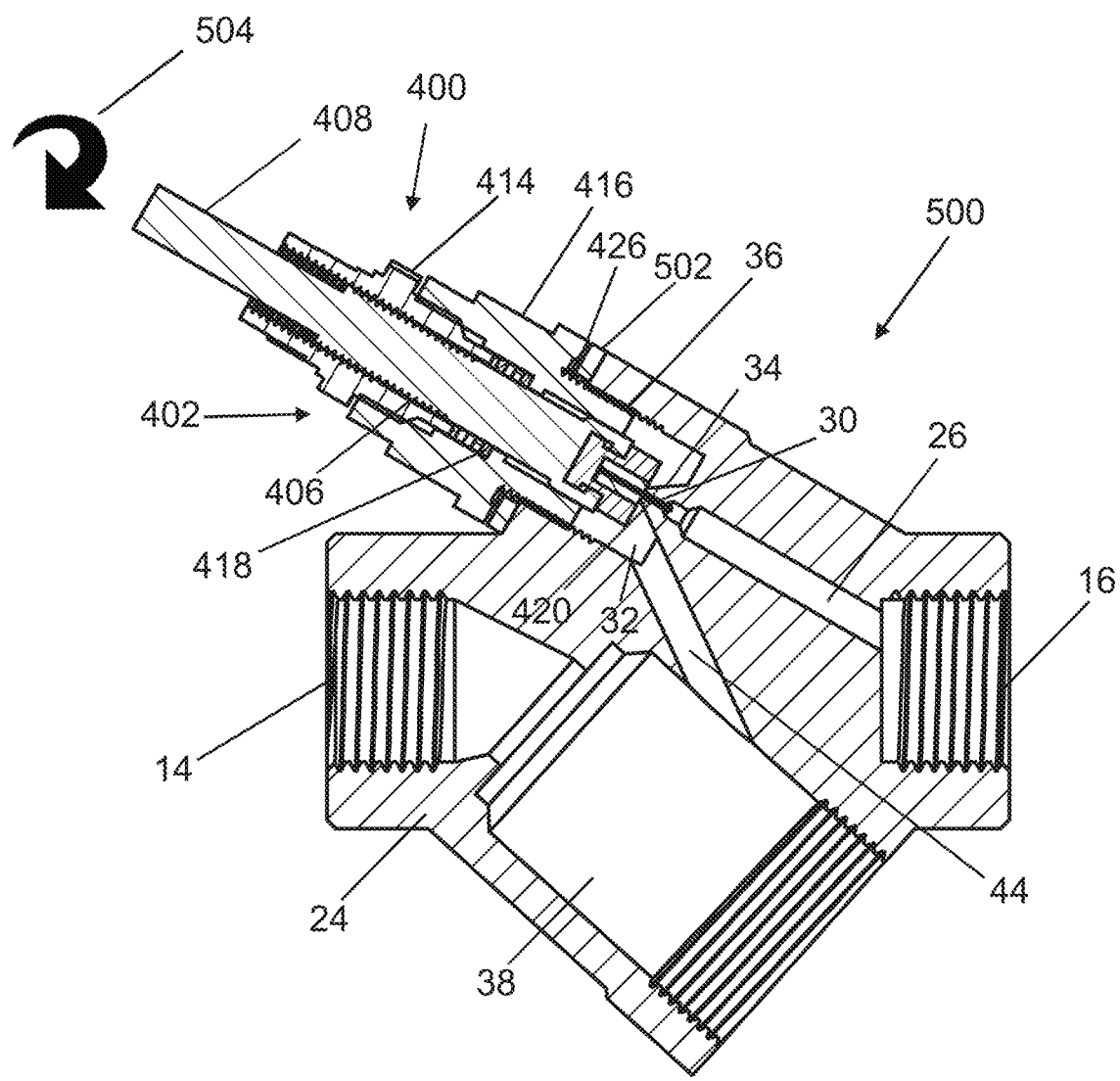

FIGS. 5A and 5B illustrate use of the cleaning device 400 with a condensate removal device 500. The condensate removal device 500 has a similar configuration to the condensate removal device 10 described in relation to FIG. 1. Reference numerals corresponding to those used in FIG. 1 are used in FIGS. 5A-5B to indicate features of the condensate removal device 300 described above in relation to FIG. 1. Some of the reference numerals relating to features of the cleaning device 400 have been omitted from FIGS. 5A and 5B for clarity purposes.

In FIGS. 5A and 5B, the cap 402 is mounted on the access opening 36 of the condensate removal device 500. The threaded surface 404 of the cap 402 is threadingly engaged with the internal surface of the drainage sub-chamber 32. The cap 402 may, for example, replace cap 48 shown in FIG. 1. The sealing surface 426 of the cap 402 forms a seal with a sealing surface 502 of the condensate removal device 500 which is disposed around the access opening 36. The seal is formed by a gasket (e.g. gasket 428) which is compressed between sealing surface 426 and sealing surface 502. The cleaning device 400 acts as a plug/stopper which closes the access opening 36 to prevent condensable gas and/or condensate from escaping from the condensate removal device 500 via the access opening 36. In particular, the seal between sealing surfaces 426 and 502 and the seal between the shaft 408 and the channel 406 prevent condensable gas and/or condensate from escaping via the access opening 36.

In the configuration shown in FIG. 5A, the shaft 408 is in the first position, i.e. stopping surface 424 is engaged with the lip 422. In other words, the shaft 408 is withdrawn as far as possible along the channel away from the entry port 34. The cleaning rod 420 is located in the drainage sub-chamber 32, and is spaced away from the entry port 34. In this configuration, the condensate removal device 500 may be operated as normal. In particular, the condensate removal device 500 having the cleaning device 400 mounted thereon may be mounted in a pipeline such that a flow of condensable gas and condensate is received in the inlet 14 of the condensate removal device 500. Thus, condensate flowing into the condensate removal device 500 may be evacuated through the condensate drainage channel 26 in the usual manner, whilst condensable gas may remain trapped in the upstream portion of the device (e.g. in the drainage sub-chamber 32).

In FIG. 5*b*, the cleaning rod 420 is inserted into the constricted passage 30 via the entry port 34, and a front surface of the shaft 408 abuts against the entry port 34. To insert the cleaning rod 420 into the constricted passage 30, the shaft 408 is moved along the channel 406 from the position shown in FIG. 5A, to advance the cleaning rod 420 into the constricted passage 30. The shaft 408 is moved along the channel 406 by rotating the shaft 408 about its axis (as illustrated by arrow 504). Engagement between threaded surfaces 410 and 412 causes the shaft 408 to advance along the channel 406. The channel 406 serves to guide the shaft 408 as it is moved, and to constrain movement of the shaft 408 to the longitudinal direction, e.g. the channel 406 restricts lateral movement of the shaft 408, which could lead to a misalignment between the cleaning rod 420 and the constricted passage 30. As the cleaning rod 420 is inserted into the constricted passage 30, any debris present may be pushed out of the constricted passage 30, so that it may be carried out of the condensate drainage channel 26 by the flow of condensate.

When the cleaning rod 420 is in the constricted passage 30, the cleaning rod 420 may restrict or block the passage of condensate through the constricted passage 30. This may prevent condensate from being evacuated through the condensate drainage channel 26 while the constricted passage 30 is being cleaned. Following cleaning of the constricted passage 30, the cleaning rod 420 may be withdrawn from the constricted passage 30 by moving the shaft 408 back along the channel 406. In this manner, evacuation of the condensate through the condensate drainage channel 26 may resume. The cleaning device 400 may be left mounted on the condensate removal device 500 (e.g. in the position shown in FIG. 5A), so that the constricted passage 30 may be cleaned as soon as a blockage occurs.

Figure 6:
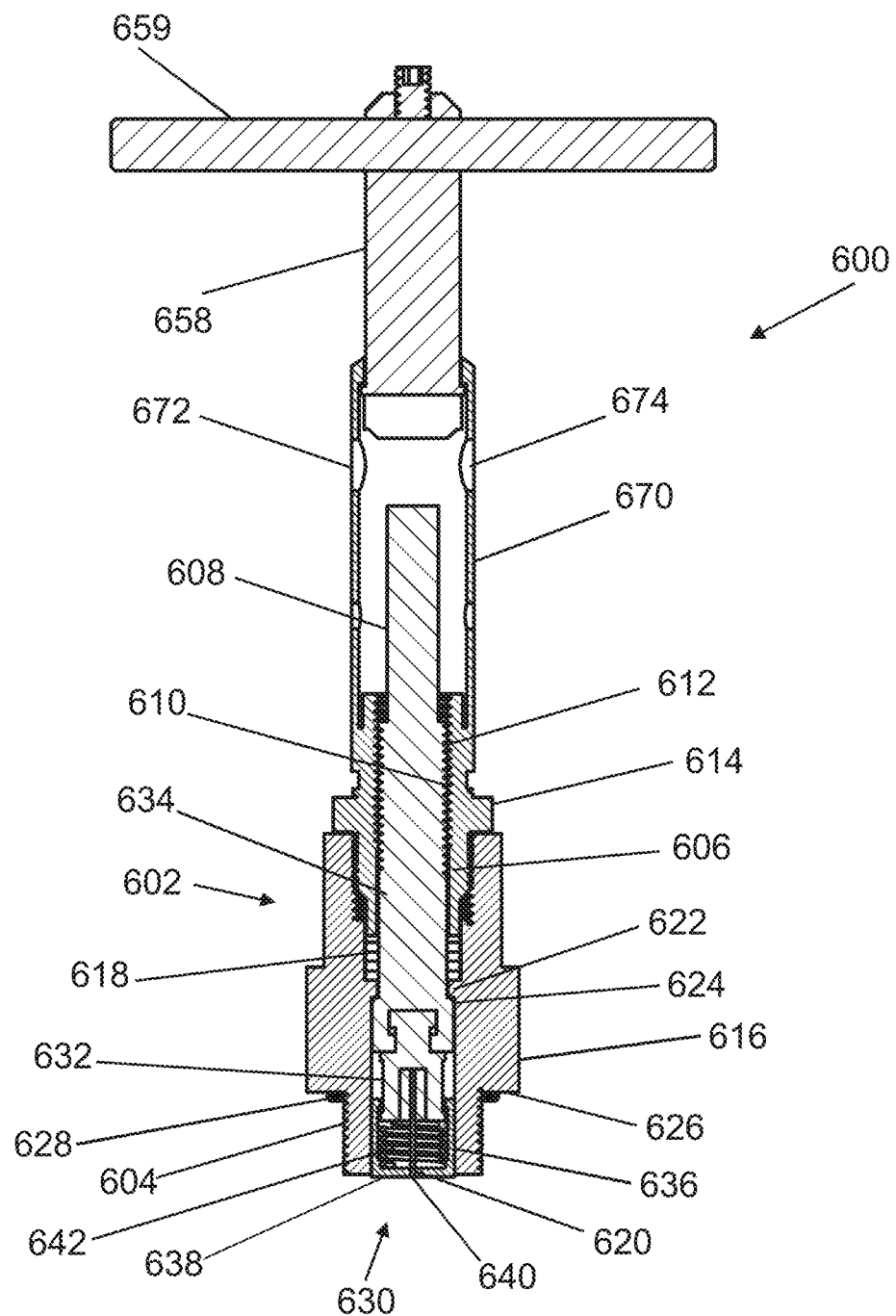
FIG. 6 shows a schematic cross-sectional side view of a cleaning device that is another embodiment of the invention.

FIG. 6 shows a cross-sectional side view of a cleaning device 600 that is another embodiment of the invention. Cleaning device 600 is mountable onto an access opening of a condensate removal device, to clean an orifice (constricted passage) in a condensate drainage channel of the condensate removal device. For example, the cleaning device 600 may be mounted on access opening 36 of condensate removal device 10, to clean constricted passage 30. Like cleaning device 400, cleaning device 600 is an "online" cleaning device, i.e. it can be used to clean a condensate removal device which is in operation.

Cleaning device 600 shares several of the features of cleaning device 400, which are not discussed again in detail. Cleaning device 600 includes a cap 602 with a threaded surface 604 for mounting the cap in an access opening of a condensate removal device. The cap 602 includes a channel 606 extending therethrough, in which a shaft 608 is disposed. The shaft 608 includes a first threaded surface 610, which is threadingly engaged with a second threaded surface 612 in the channel 606. Engagement between the first and second threaded surfaces 610, 612 translates rotational motion of the shaft 608 about its longitudinal axis into longitudinal motion of the shaft 608 along the channel. A cleaning rod 620 is mounted on a first end of the shaft 608, the cleaning rod 620 being dimensioned to fit in the orifice of a condensate removal device. The cap 602 is formed of a first part 614 and a second part 616 which are connected together via a threaded connection (see FIG. 7A). A ring-shaped gasket 618 (e.g. O-ring) is located in the channel 606 in a space between the first part 614 and the second part 616, and is compressed between the first part 614 and the second part 616. The gasket 618 functions in a similar way to gasket 418 in cleaning device 400, and forms a seal between the shaft 608 and a wall of the channel 606. A lip 622 is located in the channel 606, and is arranged to engage a stopping surface 624 on the shaft 408 when the shaft is moved along the channel 606 away from the orifice. This serves to restrict motion of the shaft 608 along the channel 606 in the direction away from the orifice. The second part 616 of the cap 602 includes a sealing surface 626 for forming a seal around an access opening of a condensate removal device when the cap 402 is mounted on the access opening. In the example shown, a gasket 628 for forming the seal is provided on the sealing surface 626.

The features of cleaning device 600 mentioned above may function in the same manner and have the same effects or advantages as the corresponding features of cleaning device 400 described above. In particular, when the cleaning device 600 is mounted on a condensate removal device, the seal between the sealing surface 626 and the condensate removal device, and the seal between the shaft 608 and the channel 606 may prevent condensable gas and/or condensate from escaping via the access opening. The seal between the shaft 608 and the channel 606 enables motion of the shaft 608 along the channel 606, so that the cleaning rod 620 can be inserted into the orifice of a condensate removal device while the condensate removal device is in operation.

The cleaning device 600 further includes a shield 630 which is mounted on the end of the shaft 608 having the cleaning rod 620. In the example shown, the shaft 608 includes a distal portion 632 in which the cleaning rod 620 is mounted. The distal portion 632 of the shaft 608 is attached to a main portion 634 of the shaft 608 via a mechanical connection. However, in other examples, the distal portion 632 of the shaft may be integrally formed with the rest of the shaft 608. The shield 630 functions in a similar manner to shield 106 of cleaning tool 100. The shield 630 includes a sleeve portion 636 which is slidable relative to the distal portion 632 of the shaft 608. The shield 630 is movable relative to the shaft 608 between a first position and a second position. When the shield 630 is in the first position, a shorter length of the distal portion 632 of the shaft 608 is located in the sleeve portion 636 than when the shield 630 is in the second position. The shield 630 includes a front face 638 having an aperture 640 therethrough, the aperture 640 being aligned with the cleaning rod 620 in the longitudinal direction (i.e. in the direction along the longitudinal axis of the shaft 608). In use, the front face 638 faces towards the entry port of the condensate drainage channel of the condensate removal device. The aperture 640 is arranged such that, when the shield 630 moves from the first position to the second position, a portion of the cleaning rod passes through the aperture 640. When the shield 630 is in the first position, the cleaning rod 620 does not protrude through the aperture 640, i.e. it is located behind the front face 638 of the shield. In this manner, the cleaning rod 620 is protected by the shield 630 when the shield is in the first position.

The shield 630 is biased towards the first position by means of a spring 642. The spring 642 is located within the sleeve portion 636 of the shield 630, between a front surface of the distal portion 632 of the shaft 608 and a back-side surface of the front face 638 of the shield 630. As the shield 630 is moved towards the second position, the spring 642 is compressed between the distal portion 632 of the shaft 608 and the front face 638 of the shield 630. This causes the spring 642 to exert a restoring force on the shield 630, to return it to the first position. In this manner, when the cleaning rod 620 is not being used, the shield 630 may automatically return to the first position to protect the cleaning rod 620. Of course, other means for biasing the shield 630 towards the first position may also be used. Use of the cleaning device 600 is discussed in more detail below in relation to FIGS. 11a-11c.

Figure 7A:
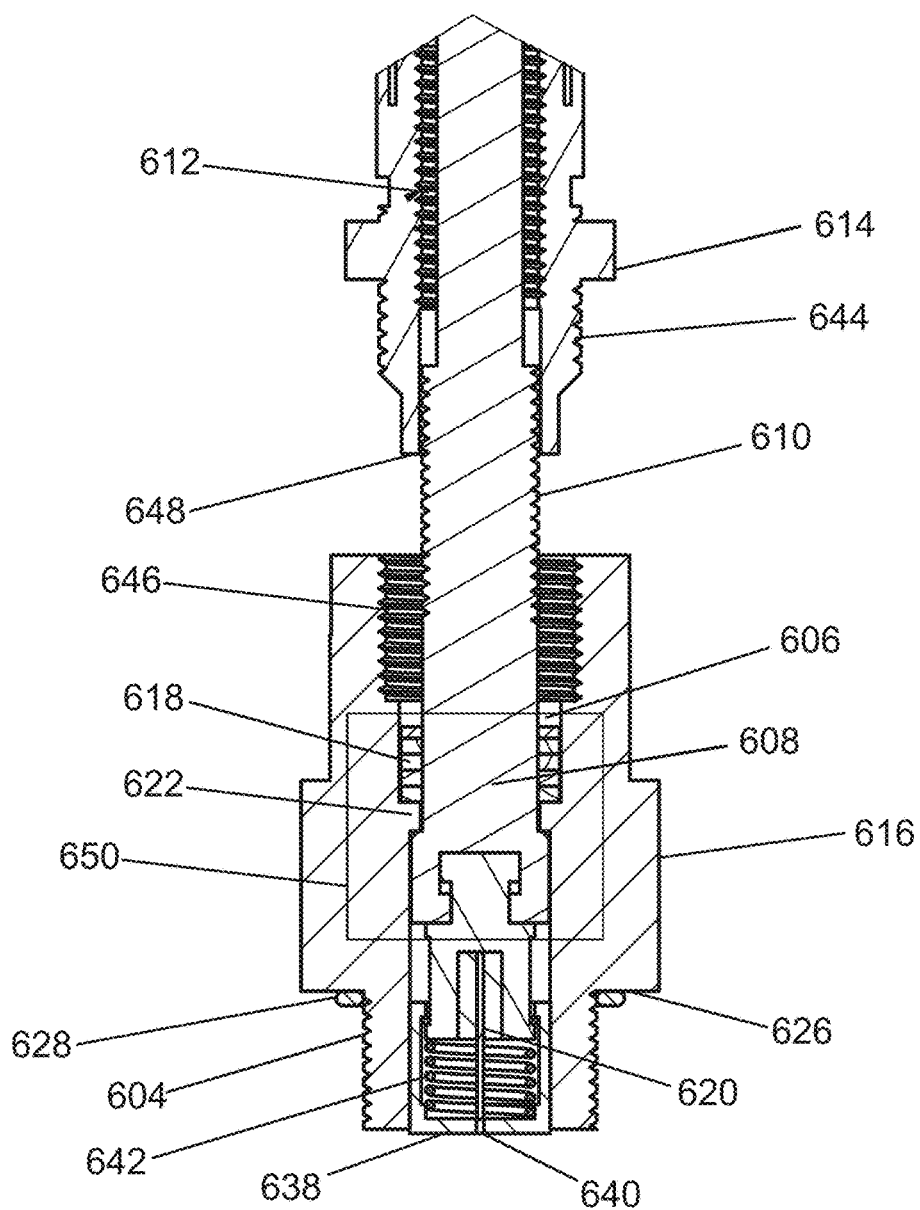
FIGS. 7A and 7B show close-up cross-sectional views of portions of the cleaning device of FIG. 6.
Figure 7B:
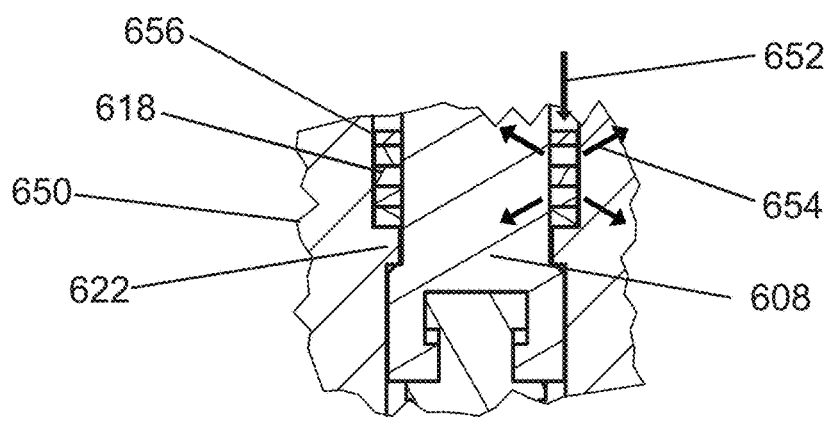

FIGS. 7A and 7B show in greater detail how the seal between the shaft 608 and the channel 606 is formed. For illustration purposes, some reference numerals are omitted from FIG. 7A, and a top portion of the cleaning device 600 is omitted from FIG. 7A. FIG. 7A shows a view of cleaning device 600, where the first part 614 and the second part 616 of the cap 602 are disconnected. The first part 614 includes a threaded outer surface 644 which is engageable with a threaded inner surface 646 in the second part 616. The gasket 618 (which may include multiple gaskets stacked on top of each other) is located around the shaft 608, in a space between the shaft 608 and a wall of the channel 606. The gasket rests on a surface of the lip 622 in the channel 606. The first part 614 includes a compression surface 648, which is configured to compress the gasket 618 against the lip 622 when the first and second parts 614, 616 are connected together. FIG. 7B shows an expanded view of region 650 indicated in FIG. 7A. Arrow 652 illustrates the direction of a force applied by the compression surface 648 on the gasket 618 when the first part 614 of the cap 602 is screwed into the second part 616. Arrows 654 illustrate how the gasket 618 expands outwards as a result of being compressed between the compression surface 648 and the lip 622. The outwards expansion of the gasket 618 causes the gasket 618 to form a seal between a wall 656 of the channel 606 and an outer surface of the shaft 608. The connection between the first part 614 and the second part 616 may be tightened or loosened, to adjust the compression of the gasket 618 and as a result the strength of the seal. The gasket 418 in cleaning device 400 may be compressed in a similar manner to that shown in FIG. 7B to form the seal between the shaft 408 and the channel 406.

Cleaning device 600 further includes a handle 658 for rotating the shaft 608 to move the shaft 608 along the channel 606. FIGS. 8A and 8B illustrate use of the handle 658 for rotating the shaft 608. For illustration purposes, the cap 602 and shield 630 are omitted from FIGS. 8A and 8B. As shown in FIG. 8A, the handle 658 includes a slot 660, which is engageable with a key 662 at the end of the shaft 608 opposite the end having the cleaning rod 620. In the example shown, the key 662 includes a pair of flat surfaces at the end of the shaft 608. However, other shapes and types of key 662 and slot 660 may be used. Of course, in other examples, the key may be disposed on the handle, whilst the slot may be disposed on the shaft. The handle 658 has a generally cylindrical body, the slot 660 being disposed at one end of the body. The handle 658 also includes a cross-bar 659, to facilitate application of torque to the handle 658. In FIG. 8A, the handle 658 is moved towards the shaft 608 to engage the key 662 in the slot 660. In FIG. 8B, the handle 658 is engaged with the shaft 608, so that rotation of the handle 658 (indicated by arrow 664) is transmitted to the shaft 608 to rotate the shaft 608 within the channel 606 (as indicated by arrow 666). Engagement between the first and second threaded surfaces 610, 612 causes the shaft 608 to move in the longitudinal direction along the channel 606, as indicated by arrows 668. A similar handle may be used to rotate shaft 408 of cleaning device 400.

Returning to FIG. 6, the first part 614 of the cap 602 includes a sleeve portion 670 which extends from a proximal end of the first part 614. The sleeve portion 670 may be a hollow piece of material having a generally cylindrical shape, which defines a passageway. A proximal portion of the shaft 608 is disposed in the sleeve portion 670, i.e. within the passageway. The sleeve portion 670 extends beyond the end of the shaft 608 having the key 662. A proximal end of the sleeve portion 670 has an opening through which the key 662 on the shaft 608 is accessible, and through which the handle 658 can be inserted to engage the slot 660 with the key 662. In this manner, the handle 658 may be inserted into the sleeve portion 670 to engage the key 662 on the shaft 608 and rotate the shaft 608. The sleeve portion 670 is dimensioned to receive the handle 658 and hold the handle 658 in place when the slot 660 and key 662 are engaged. For example, an outer diameter of the body of the handle 658 may substantially match a diameter of the passageway defined by the sleeve portion 670. Thus, an interference fit may be formed between the sleeve portion 670 and the handle 658. This may facilitate use of the handle 658 to rotate the shaft 608.

Figure 9:
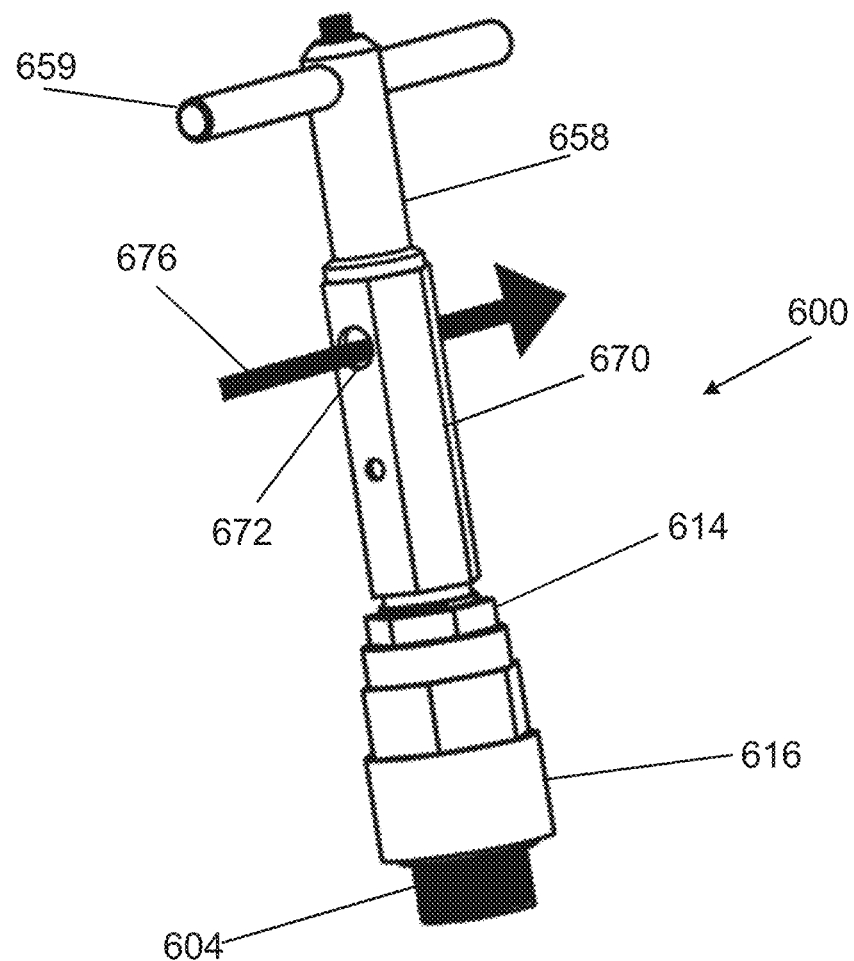
FIG. 9 shows a perspective view of the cleaning device of FIG. 6.
Figure 10:
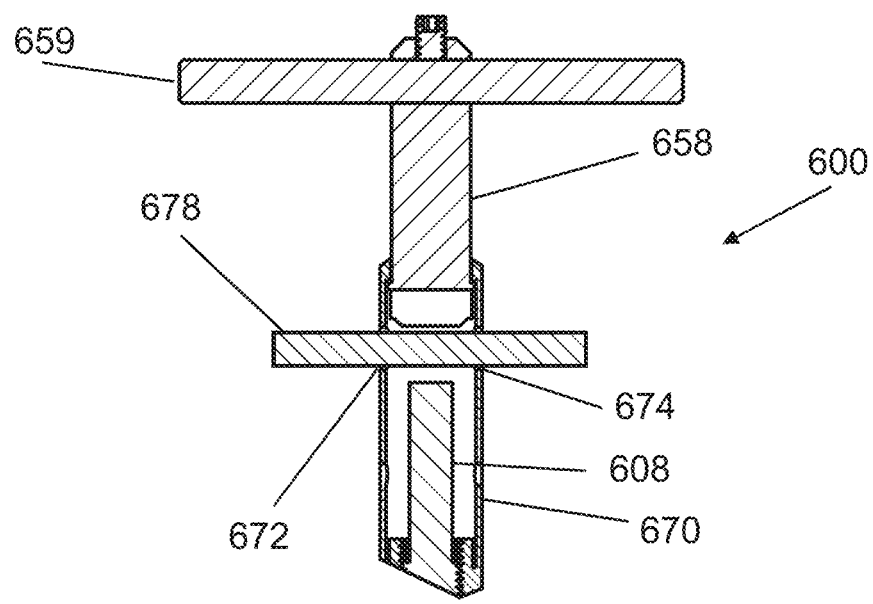
FIG. 10 shows a close-up cross-sectional view of a portion of the cleaning device of FIG. 6.

The sleeve portion 670 includes a pair of holes 672, 674 in side walls of the sleeve portion 670. The holes 672, 674 are aligned with each other, and are arranged above the shaft 608, so that a bar may be inserted through the holes 672, 674 to lie across the passageway in the sleeve portion 670. FIG. 9 shows a perspective view of cleaning device 600. Arrow 676 indicates how a bar may be inserted through the holes 672, 674. FIG. 10. shows a cross-sectional view of a top portion of cleaning device 600 when a bar 678 is inserted through holes 672, 674. When bar 678 is inserted through the holes 672, 674, it lies across the passageway defined within the sleeve portion 670. The bar 678 may thus block access to the key 662 and act to space the slot 660 on the handle from the key 662 on the shaft 608. In this manner, the cleaning device 600 may be "locked" by inserting a bar through holes 672, 674, to space the handle 658 from the shaft 608 so that the shaft 608 can no longer be turned by turning the handle 658. This may prevent the shaft 608 from being accidentally turned. In some cases, a shackle of a padlock may be inserted through the holes 672, 674 to lock the cleaning device 600 and prevent tampering with the cleaning device 600. The handle 658 may remain held in the sleeve portion 670 while the cleaning device 600 is locked.

Figure 11:
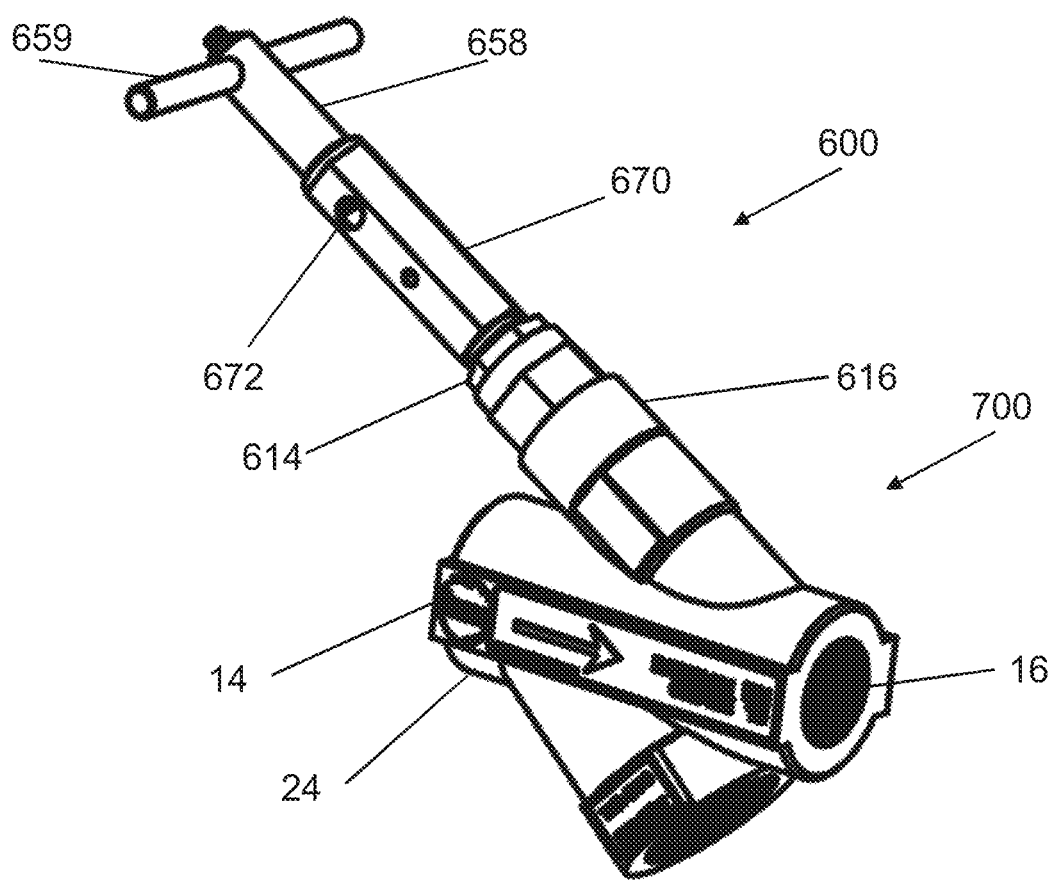
FIG. 11 shows a perspective view of the cleaning device of FIG. 6 mounted on a condensate removal device.
Figure 12A:
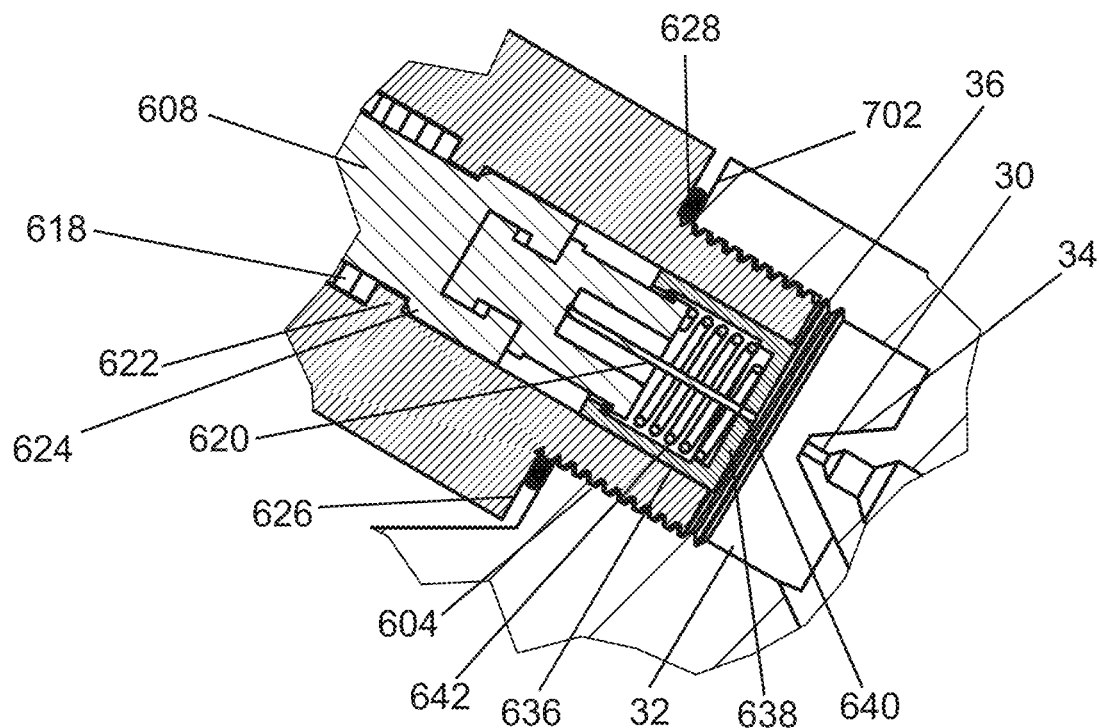
FIGS. 12A, 12B and 12C illustrate a use of the cleaning device of FIG. 6 with a condensate removal device.
Figure 12B:
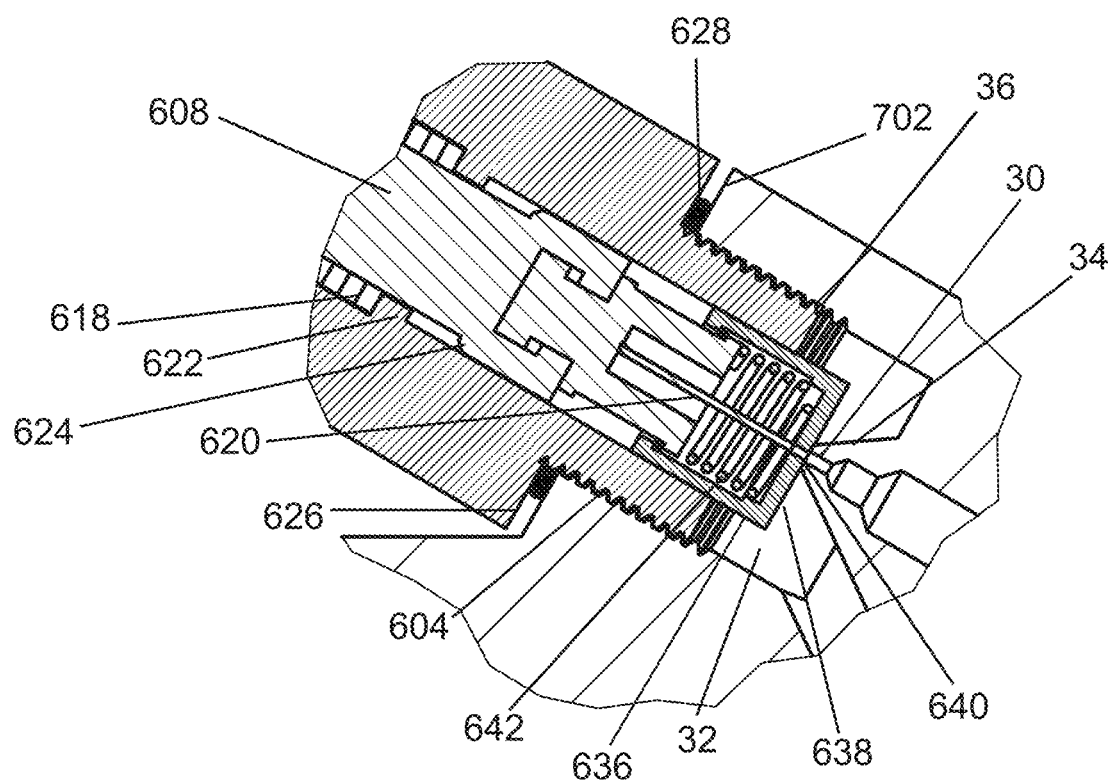
Figure 12C:
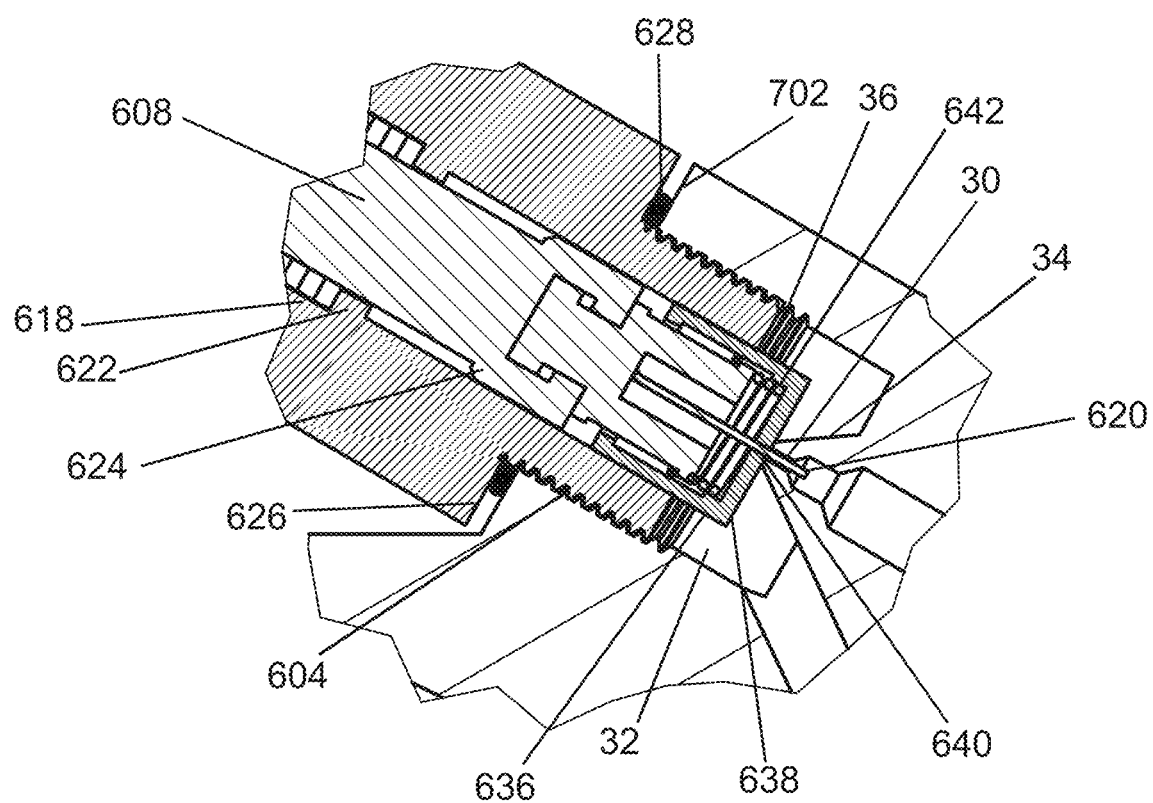

FIG. 11 shows a perspective view of cleaning device 600 mounted on a condensate removal device 700. Condensate removal device may have a similar configuration to condensate removal device 10 described above in relation to FIG. 1. Use of the cleaning device 600 is now described in relation to FIGS. 12A-12C. In FIGS. 12A-12C, the cleaning device 600 is mounted on condensate removal device 700. Reference numerals corresponding to those used in FIG. 1 are used in FIGS. 12A-12C to indicate features of the condensate removal device 700 described above in relation to FIG. 1.

FIGS. 12A-12C show close-up views of a region around the access opening 36 of the condensate removal device 700. The cap 602 of cleaning device 600 is mounted on the access opening 36 of the condensate removal device 700. The threaded surface 604 of the cap 602 is threadingly engaged with the internal surface of the drainage sub-chamber 32. The cap 602 may, for example, replace cap 48 shown in FIG. 1. The sealing surface 626 of the cap 602 forms a seal with a sealing surface 702 of the condensate removal device 700 which is disposed around the access opening 36. The seal is formed by gasket 628 which is compressed between sealing surface 626 and sealing surface 702. The cleaning device 600 acts as a plug/stopper which closes the access opening 36 to prevent condensable gas and/or condensate from escaping from the condensate removal device 700 via the access opening 36. In particular, the seal between sealing surfaces 626 and 702 and the seal between the shaft 608 and the channel 606 prevent condensable gas and/or condensate from escaping via the access opening 36.

In the configuration shown in FIG. 12A, the stopping surface 624 on the shaft 608 is engaged with the lip 622 in the channel 606, i.e. the shaft 608 is withdrawn as far as possible along the channel 606 away from the entry port 34 of the condensate drainage channel 26. Additionally, the shield 630 is in the first position, due to the biasing of spring 642. In this manner, the cleaning rod 620 is protected by the shield 630, as the cleaning rod 620 is located behind the front face 638 of the shield 630. The configuration shown in FIG. 12A may correspond to an "idle" state of the cleaning device 600, i.e. where the cleaning device 600 is mounted on the condensate removal device 700, but is not being used to clean the constricted passage 30. In this configuration, the condensate removal device 700 may operate as usual, i.e. condensable gas and condensate may flow into the condensate removal device 700, and condensate may be evacuated via the condensate drainage channel 26.

In FIG. 12B, the front face 638 of the shield 630 abuts against a surface of the entry port 34. To reach the position shown in FIG. 11*b* from that shown in FIG. 11*a*, the shaft 608 is advanced through the channel 606 towards the entry port 34. This is done by engaging the handle 658 with the shaft 608, and turning the handle 658, as shown in FIGS. 8A and 8B. In FIG. 12B, the shield 630 is still in the first position, so that the cleaning rod 620 is protected. The shaft 608 may be moved further along the channel 606 from the position shown in FIG. 12B, to reach the position shown in FIG. 12C, where the cleaning rod 620 is inserted into the constricted passage 30 via the entry port 34. In FIG. 12C, the shield 630 is in the second position and the spring 642 is in a compressed state. As the shaft 608 is moved towards the entry port 34 from the position shown in FIG. 12B, engagement between the entry port 34 and the front face 38 of the shield 630 causes the shield 630 to move along the shaft 608 from the first position to the second position. This causes the cleaning rod 620 to pass through the aperture 640 in the front face 638, and into the constricted passage 30. Thus, the front surface of the shield 630 acts as an engagement surface for engaging the entry port 34. As the cleaning rod 620 is inserted into the constricted passage 30, any debris present may be pushed out of the constricted passage 30, so that it may be carried out of the condensate drainage channel 26 by the flow of condensate.

When the cleaning rod 620 is in the constricted passage 30, the cleaning rod 620 may restrict or block the passage of condensate through the constricted passage 30. Following cleaning of the constricted passage 30, the cleaning rod 620 may be withdrawn from the constricted passage 30 by moving the shaft 608 back along the channel 606 (e.g. by turning the handle 658 in the opposite direction). As the shaft 608 is moved back along the channel 606, the spring 642 causes the shield 630 to return to the first position so that the cleaning rod 620 is once again covered. Once the cleaning rod 620 is withdrawn from the constricted passage 30, evacuation of condensate via the condensate drainage channel 26 may resume. The cleaning device 600 may be left mounted on the condensate removal device 700 (e.g. in the position shown in FIG. 12A), so that the constricted passage 30 may be cleaned as soon as a blockage occurs.

Figure 13:
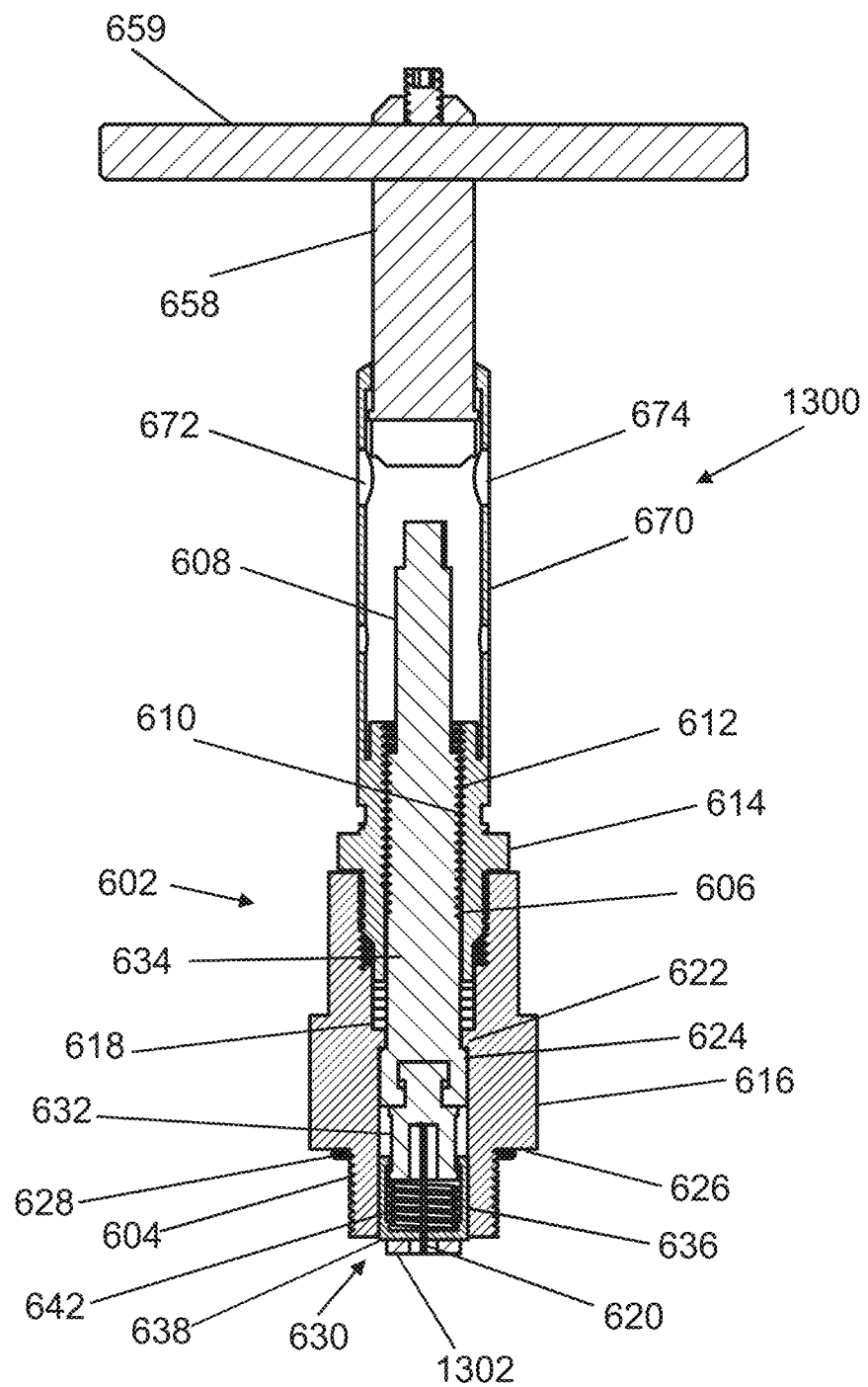
FIG. 13 shows a schematic cross-sectional side view of a cleaning device that is another embodiment of the invention.

FIG. 13 shows a cross-sectional side view of a cleaning device 1300 that is another embodiment of the invention. Cleaning device 1300 is similar to cleaning device 600, except that it further includes a magnetic ring 1302 disposed on the front face 638 of the shield 630. Reference numerals corresponding to those used in FIG. 6 are used in FIG. 13 to indicate features of cleaning device 1300 corresponding to those described above in relation to cleaning device 600. The features of cleaning device 1300 corresponding to those of cleaning device 600 may function as described above, and are not discussed again.

The magnetic ring 1302 is disposed on the front face 638 of the shield 630, and is approximately centred about the aperture 640 in the front face 638. In this manner, the magnetic ring 1302 does not block movement of the cleaning rod 620 through the aperture 640. The magnetic ring 1302 may be a permanent magnet having a ring shape. When the cleaning device 1302 is mounted on a condensate removal device, the magnetic field produced by the magnetic ring 1302 acts to deflect magnetic debris (e.g. magnetite or other ferrous-ferric oxides) away from the opening of the entry port, to prevent magnetic debris from entering the condensate drainage channel and blocking the orifice. In other embodiments (not shown), the magnetic ring 1302 may be arranged to attract magnetic debris, such that the magnetic debris is retained on the surface of the magnetic ring 1302.

Figure 14A:
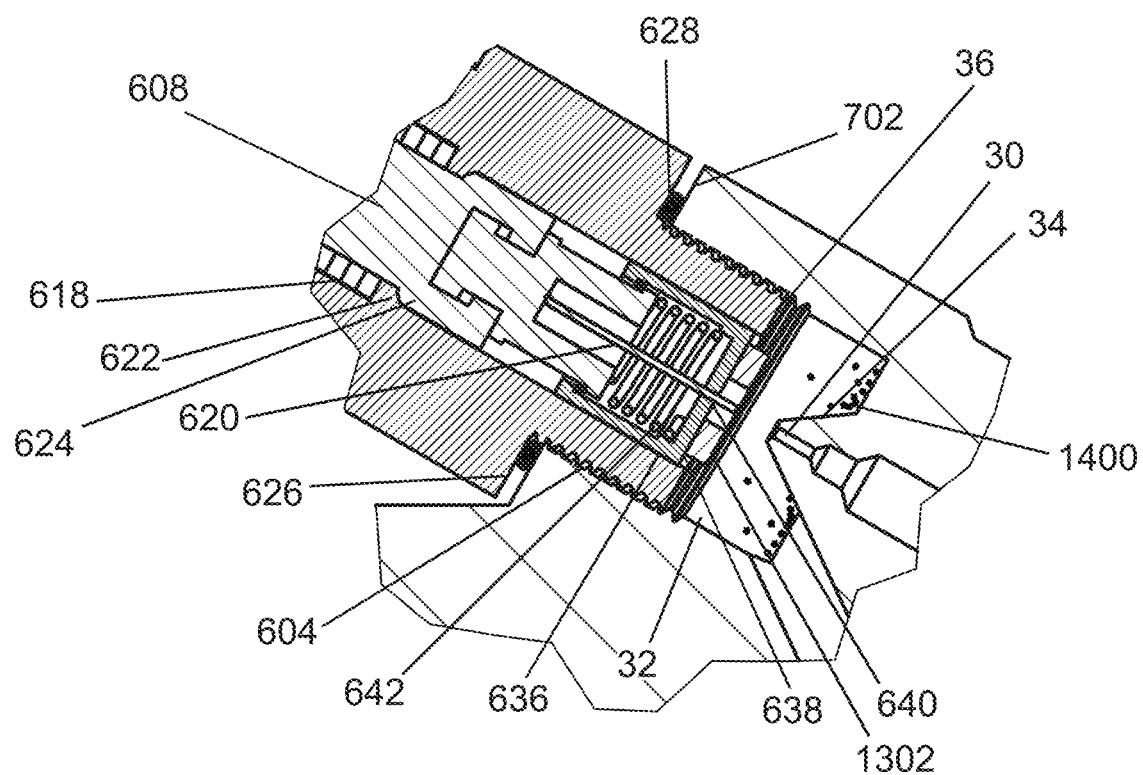
FIGS. 14A and 14B illustrate a use of the cleaning device of FIG. 13 with a condensate removal device.
Figure 14B:
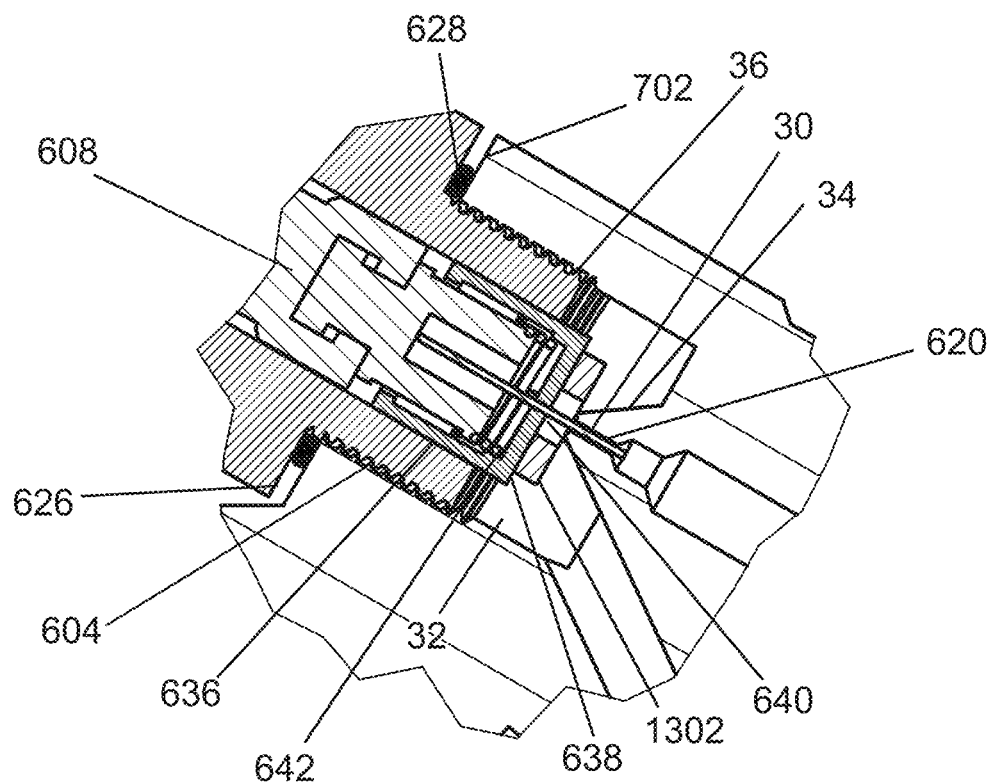

Use of the cleaning device 1300 is now described in relation to FIGS. 14A and 14B. In FIGS. 14A and 14B, cleaning device 1300 is mounted on condensate removal device 700. FIGS. 14A-14B show close-up views of a region around the access opening 36 of the condensate removal device 700. The cap 602 of cleaning device 1300 is mounted on the access opening 36 of the condensate removal device 700. The threaded surface 604 of the cap 602 is threadingly engaged with the internal surface of the drainage sub-chamber 32. The cap 602 may, for example, replace cap 48 shown in FIG. 1. As discussed above for cleaning device 600, cleaning device 1300 acts as a plug/stopper which closes the access opening 36 to prevent condensable gas and/or condensate from escaping from the condensate removal device 700 via the access opening 36.

In the configuration shown in FIG. 14A, the stopping surface 624 on the shaft 608 is engaged with the lip 622 in the channel 606, i.e. the shaft 608 is withdrawn as far as possible along the channel 606 away from the entry port 34 of the condensate drainage channel 26. The shield 630 is in the first position, due to the biasing of spring 642. FIG. 14A shows magnetic debris 1400 which is located in the drainage sub-chamber 32 of the condensate removal device 700. These magnetic debris 1400 may be carried into the condensate removal device 700 by the flow of condensable gas and condensate entering the inlet 14. As can be seen, the magnetic ring 1302 causes the magnetic debris to be deflected towards the sides of the drainage sub-chamber 32, and away from the opening of the entry port 34.

In the example shown, when the shield 630 is in the first position, a distal portion of the cleaning rod 620 protrudes through the aperture 640 in the front face 638 of the shield 630. The magnetic ring 1302 is arranged so that it is disposed around the distal portion of the cleaning rod 620 when the shield 630 is in the first position. In this manner, the magnetic ring 1302 acts as a shield for the distal portion of the cleaning rod 620. The magnetic ring 1302 may thus form an extension of the shield for protecting the cleaning rod 620.

However, in other examples, the cleaning rod 620 may be located behind the front face 638 of the shield 630 when the shield 630 is in the first position (as is the case for cleaning device 600, see e.g. FIG. 12A).

In FIG. 14B, the shield 630 is in the second position and the cleaning rod 62 is inserted into the constricted passage 30 via the entry port 34. A front surface of the magnetic ring 1302 abuts against a surface of the entry port 34. As the shaft 608 is moved forwards along the channel 606 towards the entry port 34 from the position shown in FIG. 14B, the front surface of the magnetic ring 1302 engages the surface of the entry port 34. This prevents further forward motion of the shield 630, and causes the shield 630 to move relative to the shaft 608 from the first position to the second position. Thus, the front surface of the magnetic ring 1302 acts as an engagement surface for engaging the entry port 34. Once the cleaning rod 620 has been inserted into the constricted passage 30 to clear debris from the constricted passage 30, the cleaning rod 620 may be withdrawn from the constricted passage 30 and cleaning device 1300 returned to the position shown in FIG. 14A.

Of course, magnetic structures having a different shape than the magnetic ring 1302 may be used. For example, instead of magnetic ring 1302, multiple magnets may be disposed on the front face 638 of the shield 630 around the aperture 640. The magnetic axes of the magnets may be arranged to deflect magnetic debris away from the entry port; alternatively, they may be arranged so that magnetic debris is retained on surfaces of the magnets.

The cleaning devices of the other embodiments discussed above may also be modified to incorporate a magnetic structure for preventing magnetic debris from entering the condensate drainage channel. For example, cleaning device 400 may be modified to incorporate a magnetic structure on a front face 430 of the second part 416 of the cap 402 (see FIG. 4). Alternatively, the magnetic structure may be provided on a front face 432 of the shaft 408.

The invention claimed is:

1. A condensate removal device for mounting in a pipeline, the device comprising:
   an inlet connectable to the pipeline to receive a condensable gas flow;
   an outlet connectable to the pipeline downstream of the inlet, the inlet and outlet being disposed on a pipeline axis through the device;
   a condensate drainage channel providing fluid communication between the inlet and outlet, the condensate drainage channel having an entry port from which the condensate drainage channel extends in a longitudinal direction, and an orifice that is occludable by condensate flow therethrough to restrict condensable gas flow therethrough;
   an access opening facing the entry port from an upstream side thereof, the access opening being offset from the pipeline axis;
   a cleaning device for cleaning the orifice, the cleaning device comprising:
      a cap which is mountable in the access opening of the condensate removal device; and
      a rod carrier having a cleaning rod thereon, the cleaning rod being receivable in the orifice,
      wherein the rod carrier is reciprocally movable relative to the cap, and
      wherein, when the cap is mounted in the access opening, the cleaning rod is aligned with the orifice in the longitudinal direction, and the cleaning rod is retractably insertable into the orifice by moving the rod carrier in the longitudinal direction; and
   a shield mounted on the rod carrier, the shield being movable relative to the rod carrier between a first position in which a portion of the cleaning rod is covered by the shield and a second position in which the portion of the cleaning rod is exposed.

2. The condensate removal device of claim 1, wherein the cap includes a sealing surface configured to abut against a corresponding sealing surface on the condensate removal device, to form a seal around the access opening.

3. The condensate removal device of claim 1, wherein:
   the cap includes a channel extending therethrough in a longitudinal direction; and
   the rod carrier includes a shaft, the shaft being insertable into the channel and reciprocally slidable along the channel.

4. The condensate removal device of claim 3, wherein the cap includes a sealing element for forming a seal between the shaft and the channel.

5. The condensate removal device of claim 4, wherein:
   the cap includes a first part and a second part that are connected together; and
   the sealing element includes a gasket that is compressed between the first part and the second part.

6. The condensate removal device of claim 3, wherein the shaft includes a threaded outer surface which is threadingly engageable with a corresponding threaded inner surface in the channel, the shaft being movable along the channel by relative rotation of the threaded outer surface with respect to the threaded inner surface.

7. The condensate removal device of claim 3, wherein the cleaning device includes a retraction limiter configured to limit retraction of the shaft along the channel in a proximal direction.

8. The condensate removal device of claim 7, wherein the retraction limiter includes a radial lip in the channel and a stopping surface on the shaft, the stopping surface being configured to engage the radial lip when the shaft is moved along the channel in the proximal direction.

9. The condensate removal device of claim 8, wherein, when the stopping surface on the shaft is engaged with the radial lip in the channel, the cleaning rod is disposed within the channel.

10. The condensate removal device of claim 1, wherein the cap includes a sleeve portion, the sleeve portion defining a passageway in which a proximal end of the rod carrier is disposed, and wherein the cleaning device further comprises a handle that is insertable into the sleeve portion to operationally engage the proximal end of the rod carrier.

11. A cleaning device for cleaning an orifice of a condensate drainage channel in a condensate removal device, the orifice being occludable by condensate flow therethrough to restrict condensable gas flow therethrough, the cleaning device comprising:
   a rod carrier having a cleaning rod at one end; and
   a shield mounted on the rod carrier, the shield being movable relative to the rod carrier between a first position in which a portion of the cleaning rod is covered by the shield and a second position in which the portion of the cleaning rod is exposed,
   wherein the cleaning device is insertable into an access opening of the condensate removal device at an upstream end of the condensate drainage channel, wherein the shield is retractable to the second position to permit insertion of the cleaning rod through the condensate drainage channel into the orifice.

12. The cleaning device of claim 11, wherein the shield is biased towards the first position.

13. The cleaning device of claim 11, wherein the shield includes an engagement surface configured to engage a first surface of the condensate removal device when the rod carrier is moved towards the orifice, such that engagement between the engagement surface and the first surface blocks motion of the shield towards the orifice.

14. The cleaning device of claim 11, wherein the shield includes an aperture, and wherein the cleaning rod passes through the aperture when the shield is moved from the first position to the second position.

15. The cleaning device of claim 14, wherein, when the shield is in the first position, the cleaning rod does not protrude through the aperture.

16. A condensate removal device for mounting in a pipeline, the device comprising:
   an inlet connectable to the pipeline to receive a condensable gas flow;
   an outlet connectable to the pipeline downstream of the inlet, the inlet and outlet being disposed on a pipeline axis through the device;
   a condensate drainage channel providing fluid communication between the inlet and outlet, the condensate drainage channel having an entry port from which it extends in a longitudinal direction, and an orifice that is occludable by condensate flow therethrough to restrict condensable gas flow therethrough;
   an access opening facing the entry port from an upstream side thereof, the access opening being offset from the pipeline axis; and
   a cleaning device mountable on the access opening, the cleaning device comprising:
      a rod carrier having a cleaning rod at one end; and
      a shield mounted on the rod carrier, the shield being movable relative to the rod carrier between a first position in which a portion of the cleaning rod is covered by the shield and a second position in which the portion of the cleaning rod is exposed, wherein the cleaning device is insertable into the access opening of the condensate removal device, wherein the shield is retractable to the second position to permit insertion of the cleaning rod into the orifice in the longitudinal direction.

\* \* \* \* \*